United States Patent
Nakano et al.

(10) Patent No.: US 12,258,284 B2
(45) Date of Patent: Mar. 25, 2025

(54) ACTIVATED CARBON

(71) Applicants: AD'ALL CO., LTD., Kyoto (JP); UNITIKA LTD., Hyogo (JP); OSAKA GAS CHEMICALS CO., LTD., Osaka (JP)

(72) Inventors: Tomoyasu Nakano, Kyoto (JP); Hirokazu Shimizu, Kyoto (JP); Keiji Sakai, Osaka (JP)

(73) Assignees: AD'ALL CO., LTD. (JP); UNITIKA LTD. (JP); OSAKA GAS CHEMICALS CO., LTD. (JP)

( * ) Notice: Subject to any disclaimer, the term of this patent is extended or adjusted under 35 U.S.C. 154(b) by 807 days.

(21) Appl. No.: 17/253,163

(22) PCT Filed: Jun. 18, 2019

(86) PCT No.: PCT/JP2019/024171
§ 371 (c)(1),
(2) Date: Dec. 17, 2020

(87) PCT Pub. No.: WO2019/244905
PCT Pub. Date: Dec. 26, 2019

(65) Prior Publication Data
US 2021/0261442 A1    Aug. 26, 2021

(30) Foreign Application Priority Data
Jun. 19, 2018    (JP) .................................. 2018-116190

(51) Int. Cl.
*B01J 20/20*    (2006.01)
*B01J 20/30*    (2006.01)
(Continued)

(52) U.S. Cl.
CPC ............... *C02F 1/283* (2013.01); *B01J 20/20* (2013.01); *B01J 20/30* (2013.01); *C01B 32/336* (2017.08);
(Continued)

(58) Field of Classification Search
CPC .......................... C02F 1/283; C02F 2101/36; C02F 2303/185; C02F 2307/06; B01J 20/20;
(Continued)

(56) References Cited

U.S. PATENT DOCUMENTS

2013/0211158 A1*   8/2013   Romanos .............. C01B 3/0021
                                                      502/425
2015/0352767 A1*  12/2015   Kalra ..................... D01D 5/003
                                                      423/447.2

FOREIGN PATENT DOCUMENTS

JP    7-155589 A    6/1995
JP    10-328563 A   12/1998
(Continued)

OTHER PUBLICATIONS

English language machine translation of JP2015225876, 39 pages, No Date.*

(Continued)

*Primary Examiner* — Pranav N Patel
(74) *Attorney, Agent, or Firm* — McDonald Hopkins LLC

(57) ABSTRACT

There is provided an activated carbon having a high total trihalomethane filtration capacity, even in water treatment by passing water at a high superficial velocity (SV). In the activated carbon of the present invention, a pore volume A (cc/g) of pores with a size of 1.0 nm or less, of pore volumes calculated by the QSDFT method, is 0.300 cc/g or more, and elemental vanadium and/or a vanadium compound is contained.

17 Claims, 8 Drawing Sheets

(51) Int. Cl.
*C01B 32/336* (2017.01)
*C02F 1/28* (2023.01)
*C02F 101/36* (2006.01)

(52) U.S. Cl.
CPC .... *C02F 2101/36* (2013.01); *C02F 2303/185* (2013.01)

(58) Field of Classification Search
CPC .......................... B01J 20/30; B01J 20/28004; B01J 20/28023; B01J 20/28071; B01J 20/28073; B01J 2220/42; B01J 20/0214; B01J 20/2808; B01J 20/28092; B01J 20/3071; B01J 20/3078; C01B 32/336; C01B 32/306; C01P 2006/14; D01F 9/15
See application file for complete search history.

(56) References Cited

FOREIGN PATENT DOCUMENTS

| JP | 11-049503 A | 2/1999 |
|---|---|---|
| JP | H11240707 A | 9/1999 |
| JP | 2004-182511 A | 7/2004 |
| JP | 2005-1968 A | 1/2005 |
| JP | 2006-247527 A | 9/2006 |
| JP | 2015225876 A | 12/2015 |
| JP | 2017-178635 A | 10/2017 |
| JP | 2017-179616 A | 10/2017 |
| JP | 2018-39685 A | 3/2018 |
| WO | 03026792 A1 | 4/2003 |
| WO | 2015-152391 A1 | 8/2015 |
| WO | 2017/213057 A1 | 12/2017 |

OTHER PUBLICATIONS

Pelekani et. al., Water Research, vol. 33, Issue 5, Apr. 1999, pp. 1209-1219. (Year: 1999).*
Hakimeh Sharififard and Mansooreh Soleimani, RSC Adv., 2015, 5, 80650-80660. (Year: 2015).*
Ji Sun Im et. al., Microporous and Mesoporous Materials 115 (2008) 514-521. (Year: 2008).*
C. Brasquet et. al., Carbon vol. 35, No. 9, pp. 1307-1313. 1997. (Year: 1997).*
English Translation of International Search Report mailed Sep. 17, 2019; International Patent Application No. PCT/JP2019/024171 filed Jun. 18, 2019. ISA/JP.
Extended European Search Report mailed Jan. 12, 2022; European Patent Application No. 19823076.5.

* cited by examiner

ACTIVATED CARBON

CROSS-REFERENCE TO RELATED APPLICATION

This application is a 35 U.S.C. 371 national stage filing of PCT Application No. PCT/JP2019/024171, filed on Jun. 18, 2019, which claims the benefit of Japanese Patent Application No. 2018-116190, filed on Jun. 19, 2018, both of which are incorporated herein in their entirety by reference.

TECHNICAL FIELD

The present invention relates to an activated carbon, and particularly to an activated carbon having an excellent filtration capacity for trihalomethanes at a high superficial velocity.

BACKGROUND ART

Conventionally, tap water and the like for drinking purposes contain chlorine added for disinfection. However, chlorine contained in tap water reacts with organic substances contained in the tap water to produce organic halogen compounds. For example, it is known that humic substances, which are natural organic substances, produce carcinogenic trihalomethanes upon reaction with chlorine in tap water. Therefore, activated carbons have been proposed which have an excellent filtration capacity for these organic halogen compounds contained in tap water.

As an activated carbon having an excellent filtration capacity for organic halogen compounds, an adsorbent is known which comprises a porous carbon in which a pore volume ratio of pores with a size of 20 to 100 Å (2 to 10 nm) is 5 to 50%, and a pore volume ratio of pores with a size of 10 Å (1 nm) or less is 45% or more, relative to a pore volume of pores with a size of 100 Å (10 nm) or less (see, for example, Patent Literature 1). Patent Literature 1 discloses that, in the adsorbent, the pore volume ratio of pores with a size of 20 to 100 Å is set to 5 to 50% relative to the pore volume of pores with a size of 100 Å or less, in order to increase the proportion of relatively large pores to improve the dynamic adsorption capacity; on the other hand, because it is also necessary to increase the equilibrium adsorption amount, i.e., static adsorption capacity, of the adsorbent, the pore volume ratio of pores with a size of 10 Å or less, which are effective for increasing the static equilibrium adsorption amount, is set to 45% or more. Patent Literature 1 discloses that, because of this structure, the adsorbent is excellent in both static adsorption capacity and dynamic adsorption capacity.

Moreover, an activated carbon is known in which, in a pore size distribution determined by the BJH method based on a nitrogen adsorption isotherm at 77.4 K, a pore volume of mesopores with a diameter of 30 Å or more and less than 50 Å is 0.02 to 0.40 cc/g, and a proportion of the pore volume of the mesopores in the above-defined range relative to a total pore volume is 5 to 45% (see, for example, Patent Literature 2). Patent Literature 2 discloses that the activated carbon obtained by controlling the pore volume of the mesopores (pores with a diameter of 2 to 50 nm) and the proportion thereof to fall in the above-defined ranges can be used as a material suitable for adsorbing various substances (particularly trihalomethanes).

CITATION LIST

Patent Literature

Patent Literature 1: JP 2006-247527 A
Patent Literature 2: JP 2004-182511 A

SUMMARY OF INVENTION

Technical Problem

Water filters containing such activated carbons have recently been required to provide a high total trihalomethane filtration capacity. For example, water filters have been demanded to provide a large total amount of filtrate from which total trihalomethanes have been filtered (amount of filtrate until the removal rate for total trihalomethanes decreases to 80%) based on "Test of Filtration Capacity for Volatile Organic Compounds" as specified in JIS S3201. The larger the total amount of filtrate, the longer the period during which the water filter is usable (replacement period).

Additionally, when a water filter is used for a faucet-integrated water purifier, the water filter needs to be reduced in size. When a water filter has a small size, the superficial velocity (SV) increases, which makes it difficult for the water filter to maintain a high total trihalomethane filtration capacity.

In the activated carbons disclosed in Patent Literatures 1 and 2 above, the volume of so-called mesopores with a size of 2 nm or more is increased to improve the dynamic adsorption capacity to achieve an improved adsorption capacity for total trihalomethanes. However, research by the present inventors has revealed that the activated carbons disclosed in Patent Literatures 1 and 2, which were evaluated at an SV of 1000 $h^{-1}$, cannot exhibit a sufficient filtration capacity for total trihalomethanes at a high superficial velocity (for example, an SV of about 3000 $h^{-1}$).

It is a main object of the present invention to solve the aforementioned problem to thereby provide an activated carbon having a high total trihalomethane filtration capacity, even in water treatment by passing water at a high superficial velocity (SV), and a method for producing the activated carbon.

Solution to Problem

As a result of their extensive research, the present inventors arrived at a solution that is completely different from the approach of increasing the volume of mesopores as disclosed in Patent Literatures 1 and 2 above.

Specifically, as disclosed in Patent Literatures 1 and 2, the prior art considers increasing mesopores to improve the dynamic adsorption capacity, in order to improve the adsorption capacity for total trihalomethanes. Thus, in the prior art, in order to allow the activation of mesopores to proceed, the activation is performed using, as the activation gas, steam, which allows the activation to proceed relatively easily. Moreover, as disclosed in Patent Literature 2, the prior art considers incorporating a metal compound into an activated carbon precursor, and activating the activated carbon precursor using steam as the activation gas, in order to allow the activation of mesopores to proceed. That is, in the prior art, the metal compound incorporated into the activated carbon precursor is used to develop mesopores.

On the other hand, extensive research by the present inventors has revealed that when a vanadium compound is used as the metal compound to be incorporated into an activated carbon precursor, and $CO_2$, which reacts with the activated carbon precursor more slowly than steam, is selected as the activation gas, and then the activated carbon precursor is activated, the rate of development of pores with a size of 1.0 nm or less is markedly increased compared to when, for example, other metal compounds are used, or no metal is used, or when a material different from $CO_2$ is used as the activation gas. That is, conventionally, the metal compound incorporated into an activated carbon precursor has been used to develop mesopores; however, it has been revealed that when a vanadium compound is used as the metal compound to be incorporated into an activated carbon precursor, and the activated carbon precursor is activated using $CO_2$, the vanadium compound surprisingly has a significant effect on the development of pores with a size of 1.0 nm or less, which are smaller than mesopores, and a behavior that is completely different from the behaviors when, for example, other metal compounds are used, is exhibited in terms of the development of the pores with a size of 1.0 nm or less.

Further research by the present inventors has subsequently revealed that, as described above, by using a vanadium compound as the metal compound to be incorporated into an activated carbon precursor, and selecting $CO_2$, which reacts with the activated carbon precursor more slowly than steam, as the activation gas, and then activating the activated carbon precursor, and also by controlling the pore volume of pores with a size of 1.0 nm or less, of pore volumes calculated by the QSDFT method, to fall in a specific range, an activated carbon is obtained having a high total trihalomethane filtration capacity, even in water treatment by passing water at a high superficial velocity (SV), without the need to develop mesopores.

The present invention was completed as a result of further research based on these findings.

In summary, the present invention provides the following aspects of the invention:

Item 1. An activated carbon in which a pore volume A (cc/g) of pores with a size of 1.0 nm or less, of pore volumes calculated by the QSDFT method, is 0.300 cc/g or more, and
    elemental vanadium and/or a vanadium compound is contained.

Item 2. The activated carbon according to item 1, wherein a pore volume B (cc/g) of pores with a size of 1.5 nm or less, of pore volumes calculated by the QSDFT method, is 0.38 cc/g or more.

Item 3. The activated carbon according to item 1 or 2, wherein a proportion of the pore volume A relative to the pore volume B (pore volume A/pore volume B) is 0.75 to 1.00.

Item 4. An activated carbon obtained by washing for removal of at least a portion of the elemental vanadium and/or the vanadium compound contained in the activated carbon according to any one of items 1 to 3.

Item 5. An activated carbon obtained by a method comprising the step of activating an activated carbon precursor comprising 0.05 to 1.5% by mass of vanadium at a temperature of 900 to 1000° C. in an atmosphere having a $CO_2$ concentration of 90% by volume or more.

Item 6. The activated carbon according to item 5, comprising, after the step of activating, the step of washing for removal of at least a portion of elemental vanadium and/or a vanadium compound contained in the activated carbon.

Item 7. The activated carbon according to any one of items 1 to 6, wherein the activated carbon has a total trihalomethane filtration capacity of 50 L/g or more.

Item 8. The activated carbon according to any one of items 1 to 7, wherein the activated carbon is a fibrous activated carbon.

Item 9. The activated carbon according to any one of items 1 to 8, which is for use as a water filter.

Item 10. A water filter comprising the activated carbon according to any one of items 1 to 9.

Item 11. A water purification cartridge comprising the water filter according to item 10.

Item 12. A water purifier comprising the water purification cartridge according to item 11.

Advantageous Effects of Invention

The present invention can provide an activated carbon having a high total trihalomethane filtration capacity, even in water treatment by passing water at a high superficial velocity (SV).

DESCRIPTION OF EMBODIMENTS

An activated carbon of the present invention will be hereinafter described in detail.

In the activated carbon of the present invention, a pore volume A (cc/g) of pores with a size of 1.0 nm or less, of pore volumes calculated by the QSDFT method, is 0.300 cc/g or more, and elemental vanadium and/or a vanadium compound is contained. As described below, the elemental vanadium and/or the vanadium compound contained in the activated carbon of the present invention is derived from the vanadium compound contained in an activated carbon precursor before activation. In the present invention, at least a portion of the elemental vanadium and/or the vanadium compound contained in the activated carbon may be removed by washing.

As used herein, the pore volume refers to the pore volume calculated by the QSDFT (Quenched Solid Density Functional Theory) method. The QSDFT method is an analytical technique for analyzing pore sizes of geometrically and chemically disordered microporous and mesoporous carbons. This technique can calculate pore size distributions from about 0.5 nm up to about 40 nm. The QSDFT method provides a significant improvement in the accuracy of pore size distribution analysis, by explicitly taking into account the effects of pore surface roughness and heterogeneity. In the present invention, nitrogen adsorption isotherm measurement is performed using "AUTOSORB-1-MP" available from Quantachrome, and pore size distribution analysis is performed using the QSDFT method. The pore volume of pores with a specific range of sizes can be calculated by calculating a pore size distribution by applying the calculation model, $N_2$ at 77K on carbon [slit pore, QSDFT equilibrium model], to a nitrogen desorption isotherm measured at a temperature of 77 K.

Figure 1:
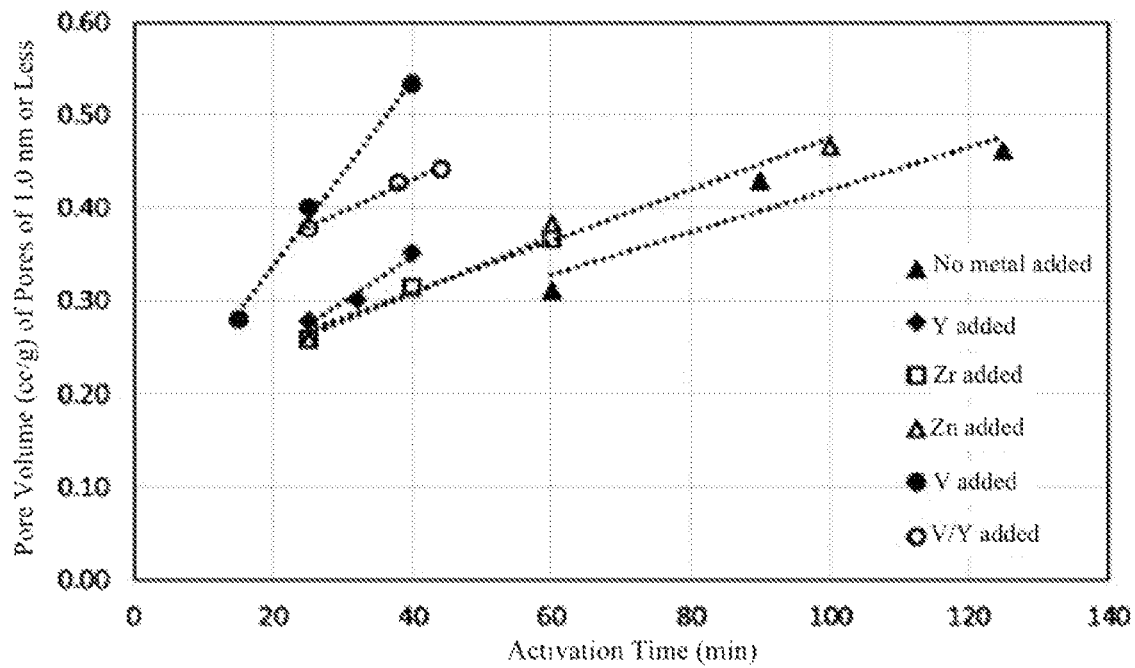
FIG. 1 is a graph showing the relationship between the activation time and the pore volume of pores with a size of 1.0 nm or less when an activated carbon precursor containing a vanadium compound is activated using $CO_2$ as the activation gas.
Figure 2:
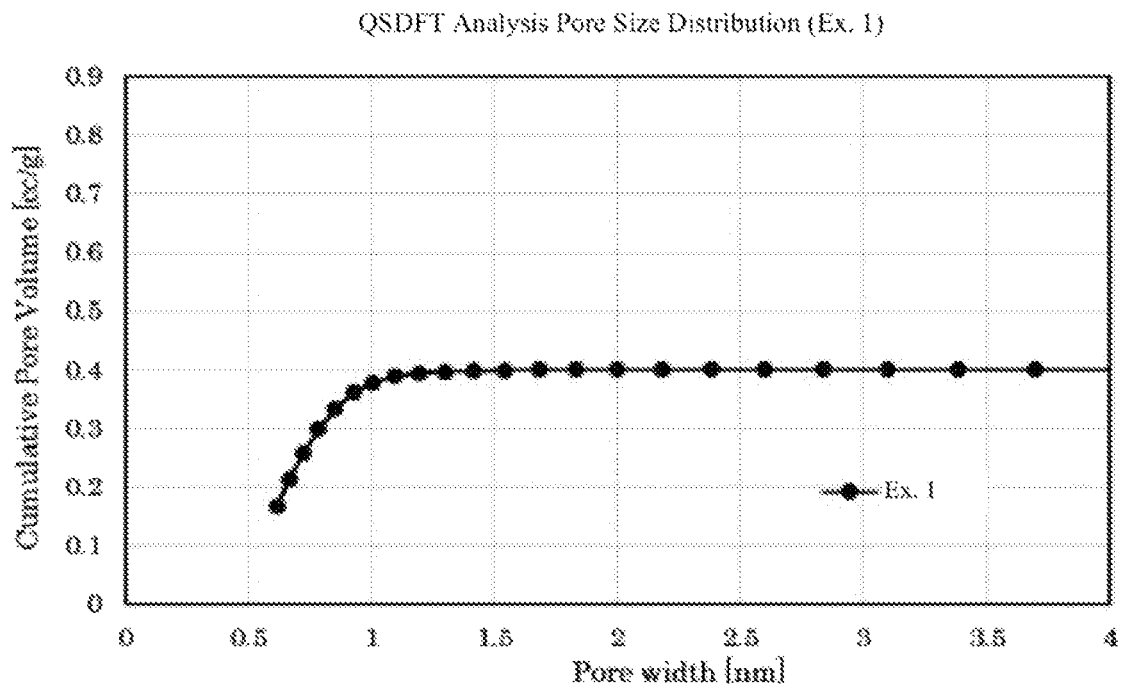
FIG. 2 is a graph showing a pore size distribution of an activated carbon of Example 1 calculated by the QSDFT method.
Figure 3:
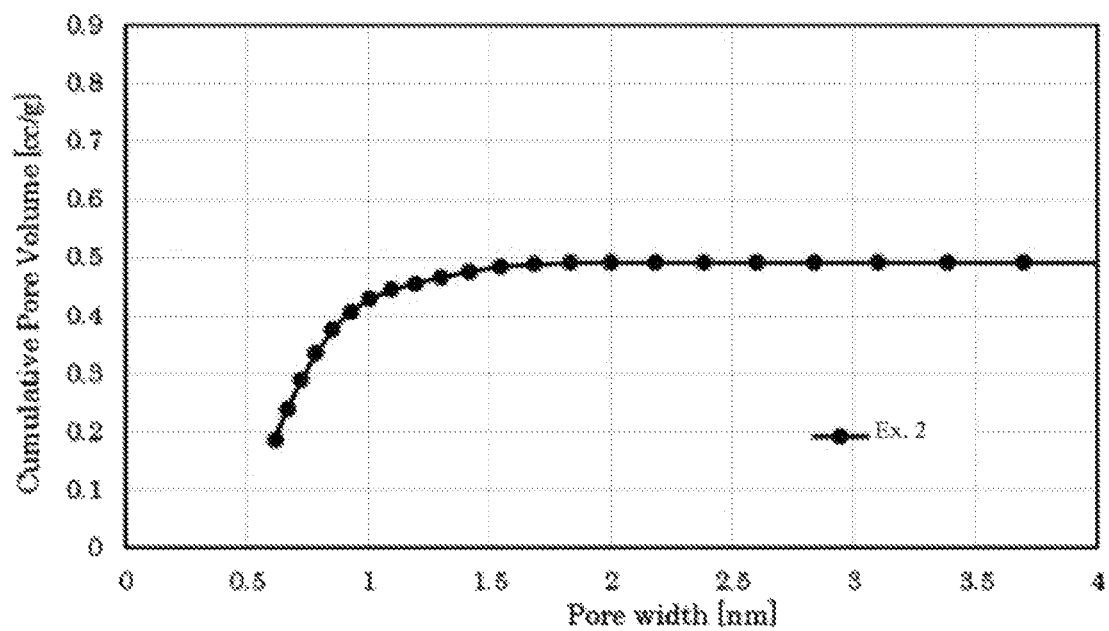
FIG. 3 is a graph showing a pore size distribution of an activated carbon of Example 2 calculated by the QSDFT method.
Figure 4:
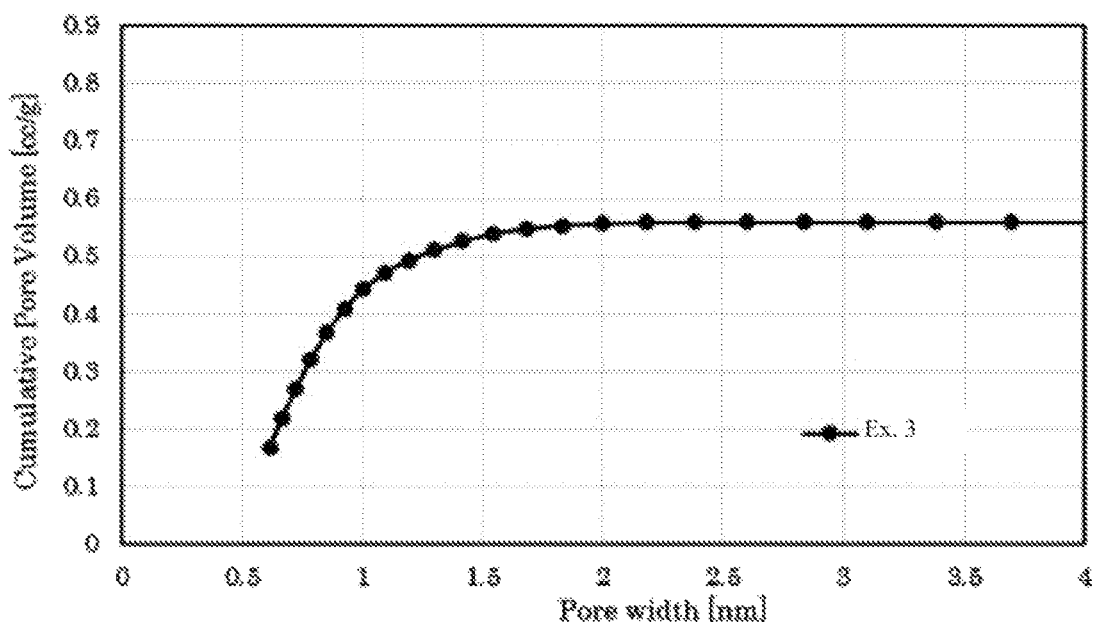
FIG. 4 is a graph showing a pore size distribution of an activated carbon of Example 3 calculated by the QSDFT method.
Figure 5:
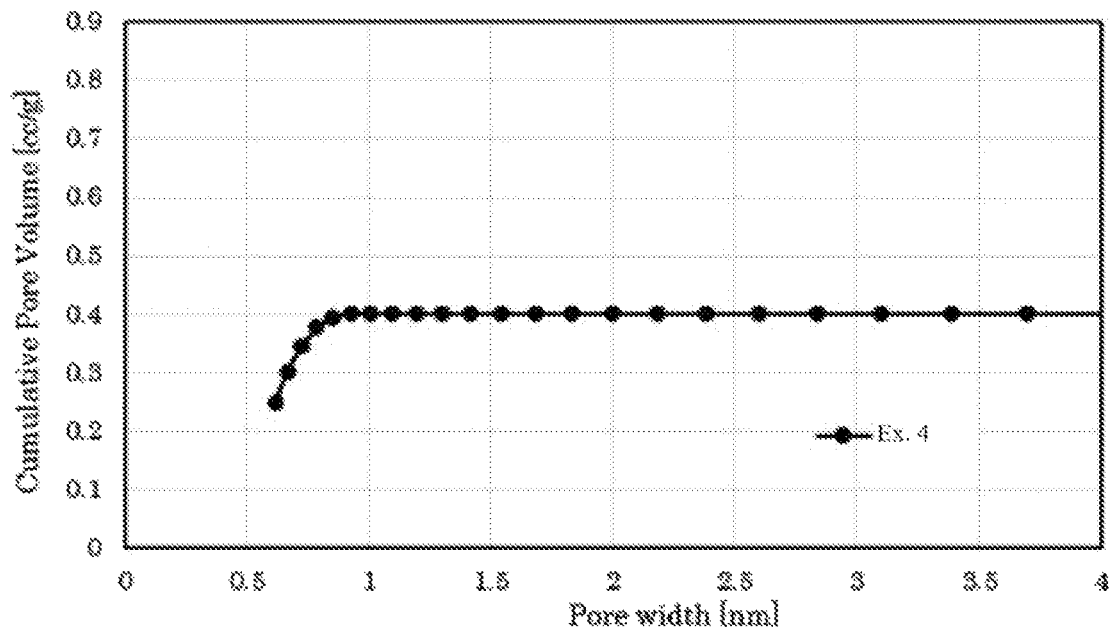
FIG. 5 is a graph showing a pore size distribution of an activated carbon of Example 4 calculated by the QSDFT method.
Figure 6:
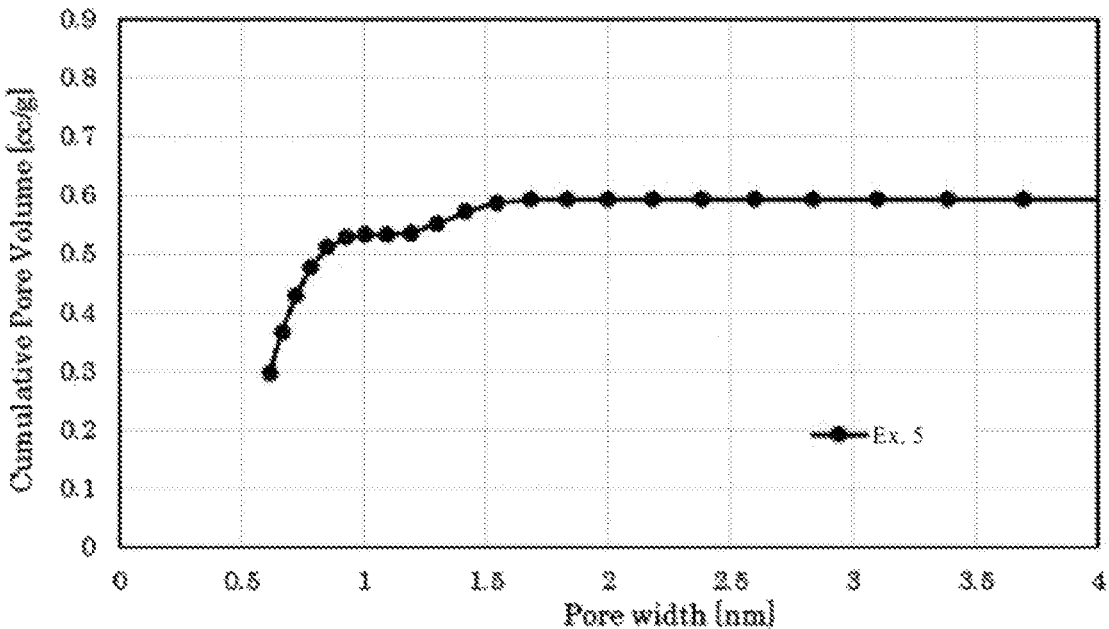
FIG. 6 is a graph showing a pore size distribution of an activated carbon of Example 5 calculated by the QSDFT method.
Figure 7:
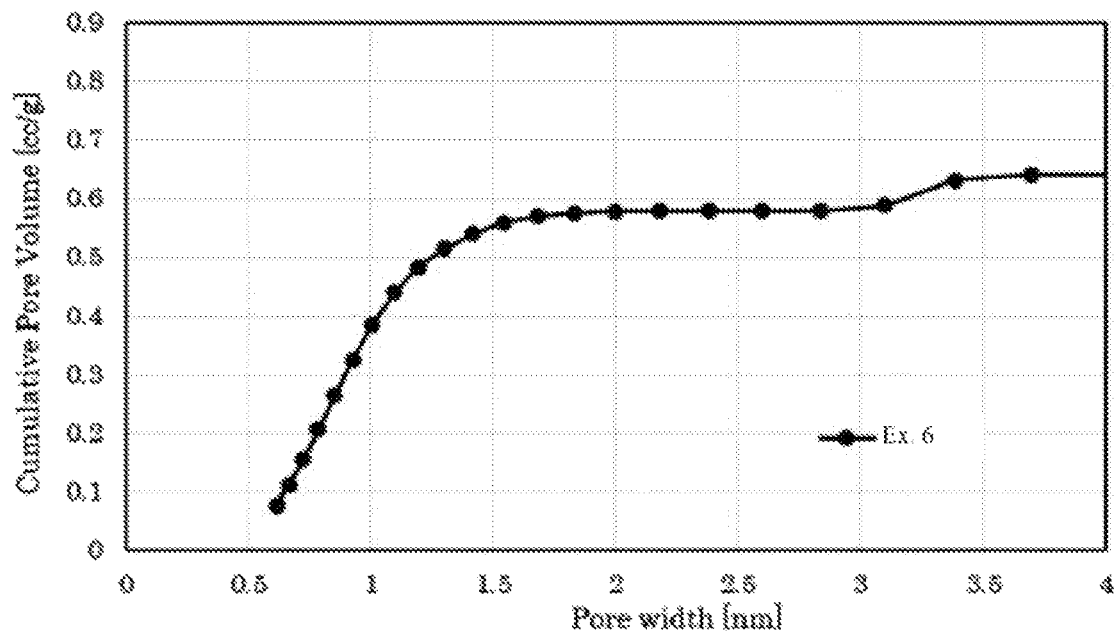
FIG. 7 is a graph showing a pore size distribution of an activated carbon of Example 6 calculated by the QSDFT method.
Figure 8:
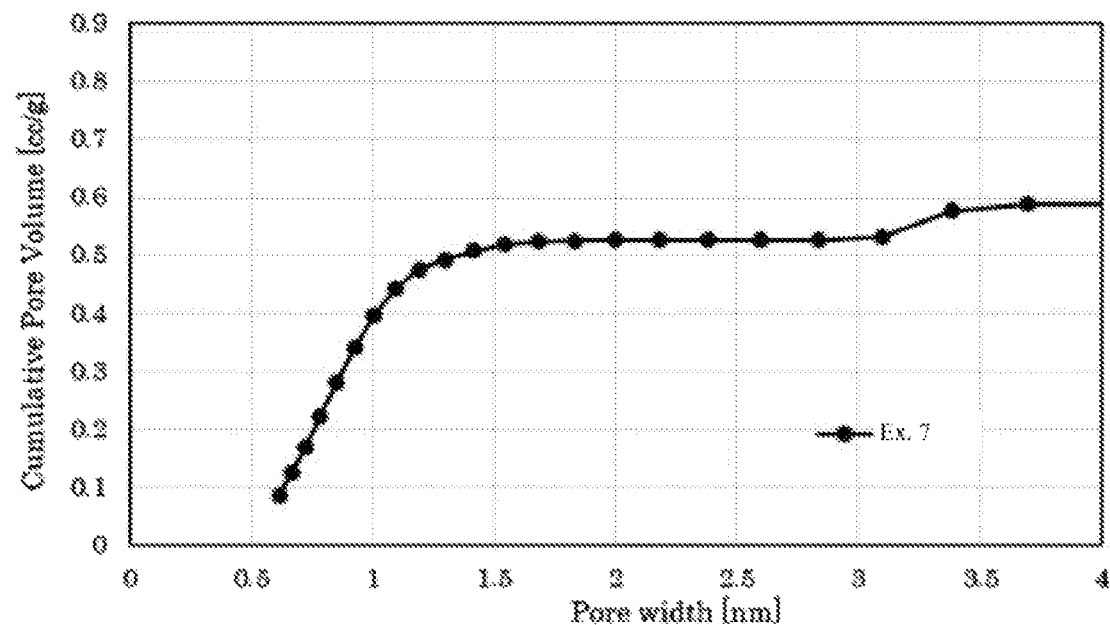
FIG. 8 is a graph showing a pore size distribution of an activated carbon of Example 7 calculated by the QSDFT method.
Figure 9:
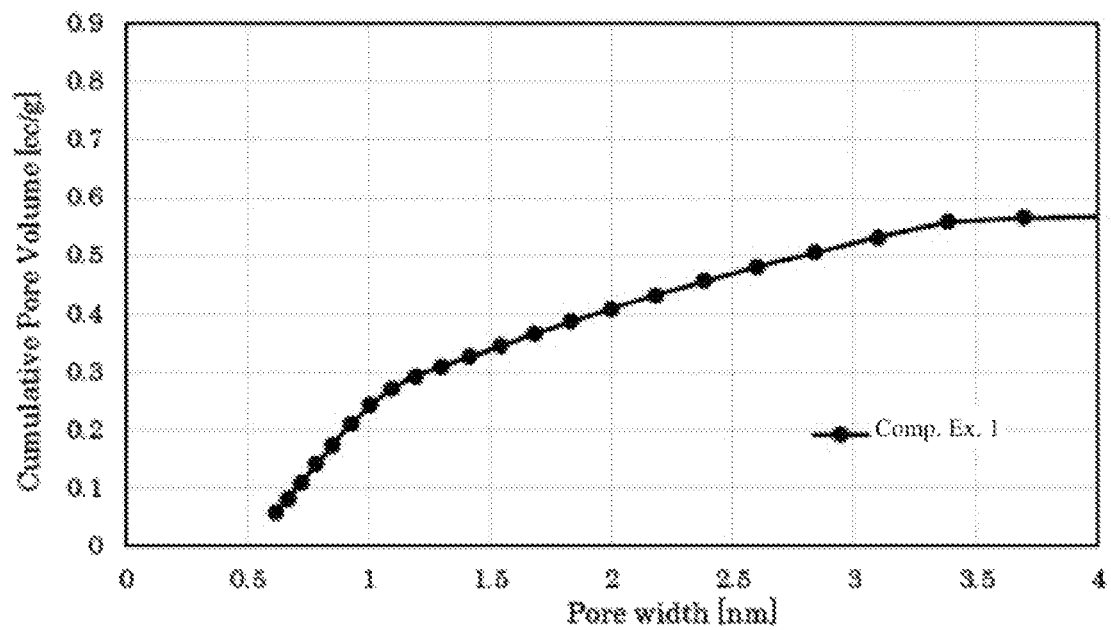
FIG. 9 is a graph showing a pore size distribution of an activated carbon of Comparative Example 1 calculated by the QSDFT method.
Figure 10:
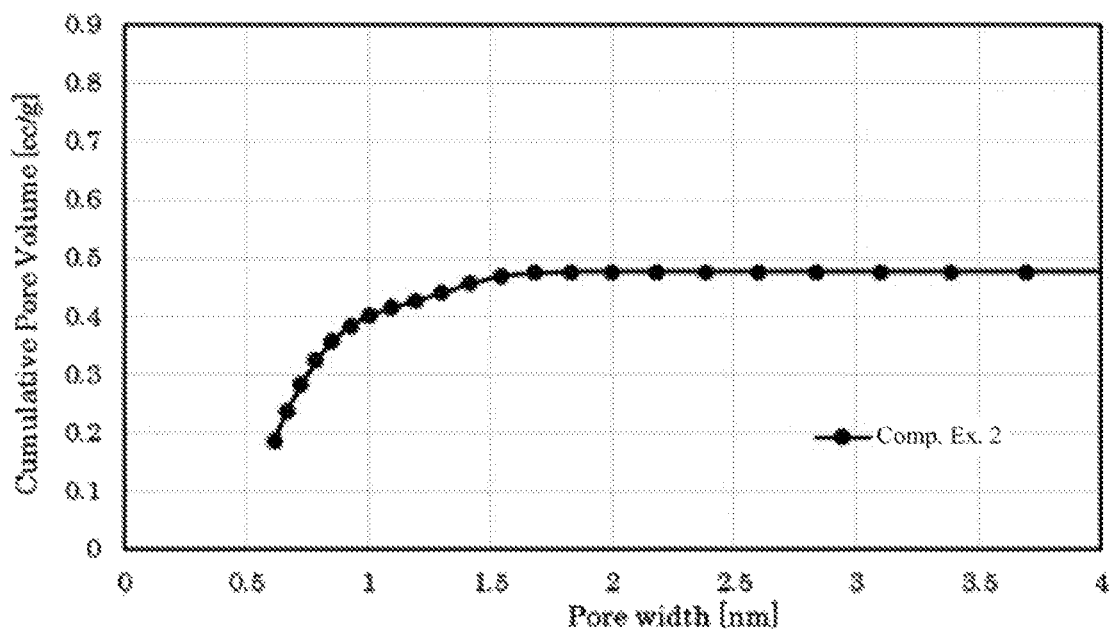
FIG. 10 is a graph showing a pore size distribution of an activated carbon of Comparative Example 2 calculated by the QSDFT method.
Figure 11:
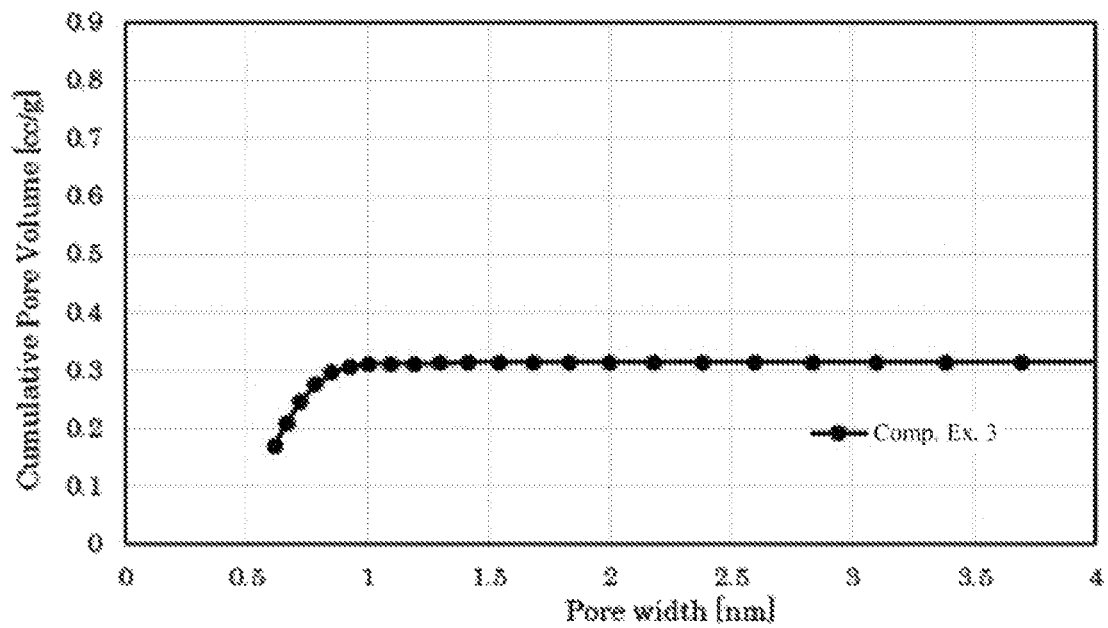
FIG. 11 is a graph showing a pore size distribution of an activated carbon of Comparative Example 3 calculated by the QSDFT method.
Figure 12:
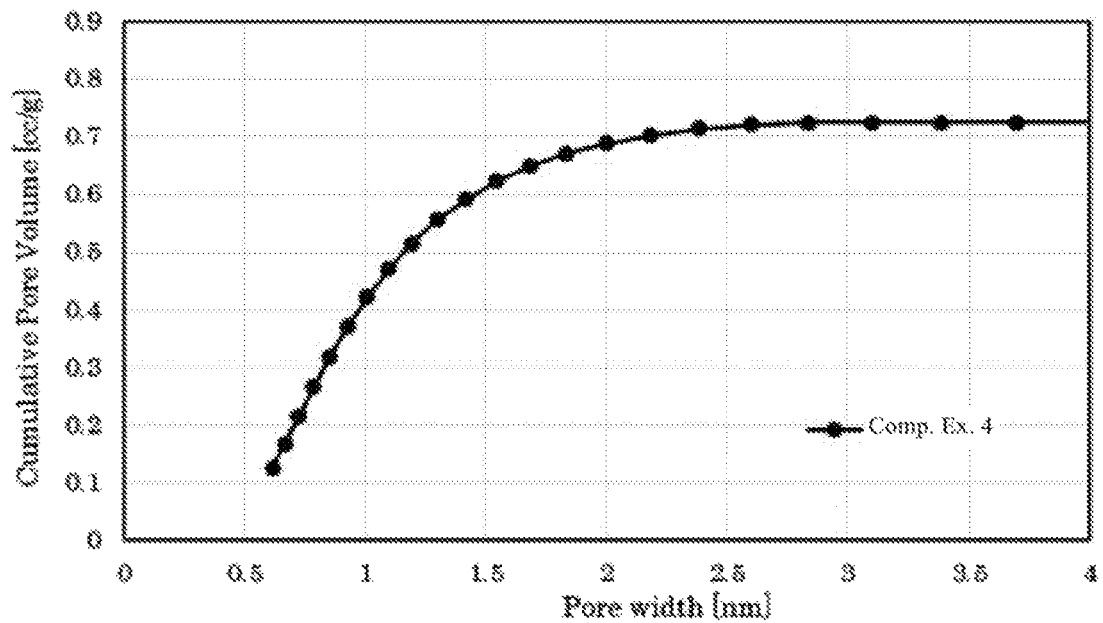
FIG. 12 is a graph showing a pore size distribution of an activated carbon of Comparative Example 4 calculated by the QSDFT method.
Figure 13:
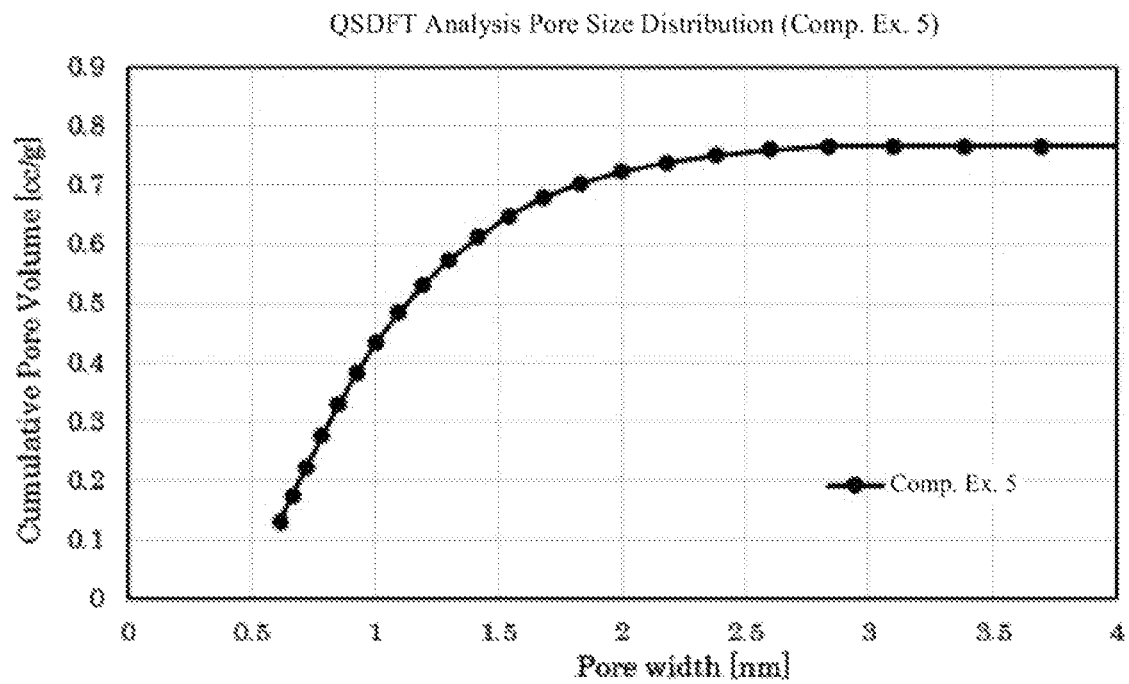
FIG. 13 is a graph showing a pore size distribution of an activated carbon of Comparative Example 5 calculated by the QSDFT method.
Figure 14:
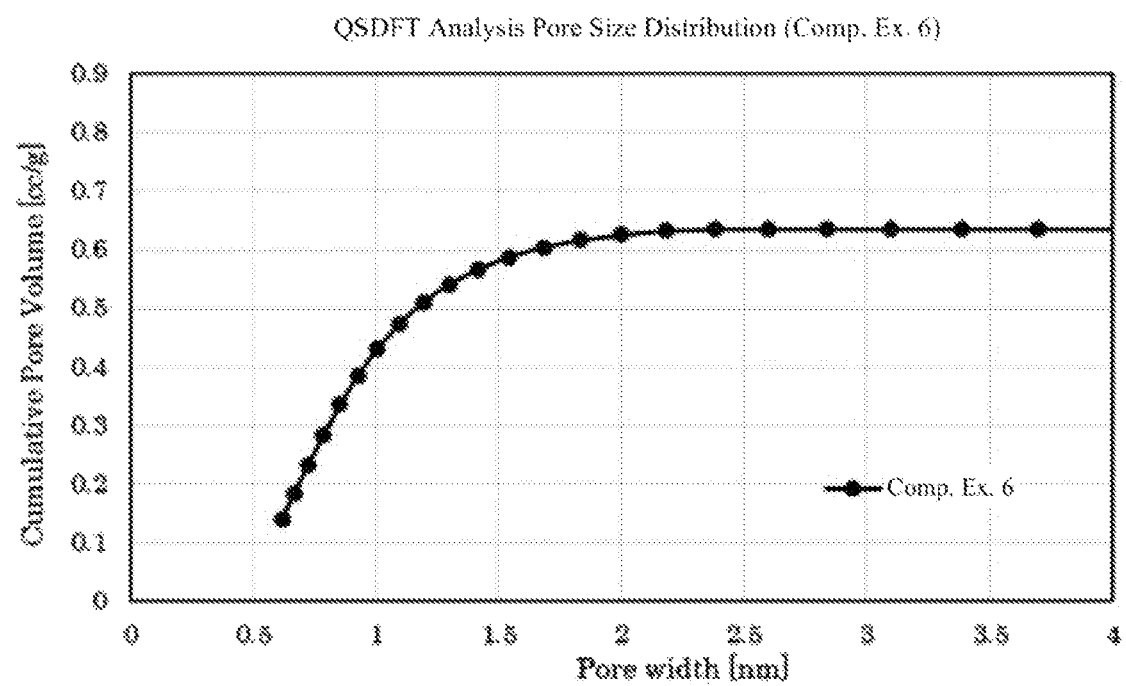
FIG. 14 is a graph showing a pore size distribution of an activated carbon of Comparative Example 6 calculated by the QSDFT method.
Figure 15:
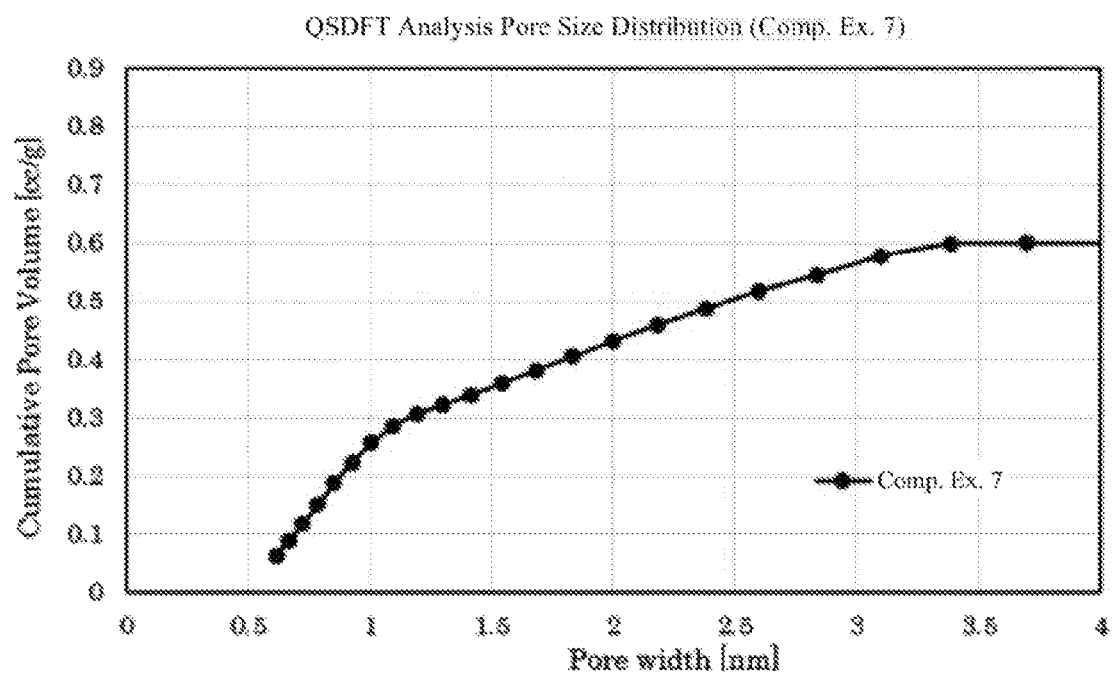
FIG. 15 is a graph showing a pore size distribution of an activated carbon of Comparative Example 7 calculated by the QSDFT method.

FIG. 1 is a graph showing the relationship between the activation time and the pore volume of pores with a size of 1.0 nm or less when an activated carbon precursor containing a vanadium compound is activated using $CO_2$ as the activation gas. The following describes the fact that when a vanadium compound is used as the metal compound to be incorporated into an activated carbon precursor, and the activated carbon precursor is activated using $CO_2$, the vanadium compound has a significant effect on the development of pores with a size of 1.0 nm or less, and a behavior that is completely different from the behaviors when, for example, other metal compounds are used, is exhibited in terms of the development of the pores with a size of 1.0 nm or less.

Tests shown in FIG. 1 are described first.

Tests were conducted under conditions 1-1 to 6-3 described below.

<Condition 1-1: V Added>

A mixture obtained by mixing 100 parts by mass of granular coal pitch having a softening point of 280° C. as an organic material with 0.6 part by mass of bis(2,4-pentanedionato)vanadium(IV) oxide (CAS NO: 3153-26-2) was fed into a melt extruder, where it was melted and mixed at a melting temperature of 320° C., and spun at a discharge rate of 16 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the vanadium content was 0.094% by mass. 10 g of the activated carbon precursor was placed in an activation furnace (volume: 0.044 m³), and a gas having a $CO_2$ concentration of 100% by volume and a temperature of about 20° C. was introduced into the activation furnace at a flow rate of about 15 L/min (calculated at 0° C. and 1 atmosphere). The activated carbon precursor was activated by conducting a heat treatment for 15 minutes at an atmospheric temperature of 950° C. in the activation furnace. As a result, an activated carbon of condition 1-1 was obtained. In the activated carbon, the pore volume A of pores with a size of 1.0 nm or less was 0.280 cc/g.

<Condition 1-2: V Added>

An activated carbon of condition 1-2 was obtained as in condition 1-1, except that the activation time was 25 minutes. In the activated carbon, the pore volume A of pores with a size of 1.0 nm or less was 0.401 cc/g.

<Condition 1-3: V Added>

An activated carbon of condition 1-3 was obtained as in condition 1-1, except that the activation time was 40 minutes. In the activated carbon, the pore volume A of pores with a size of 1.0 nm or less was 0.500 cc/g.

The relationships between the activation times of conditions 1-1 to 1-3 and the pore volume A of pores with a size of 1.0 nm or less are plotted in FIG. 1.

<Condition 2-1: V/Y Added>

A mixture obtained by mixing 100 parts by mass of granular coal pitch having a softening point of 280° C. as an organic material with 0.6 part by mass of bis(2,4-pentanedionato)vanadium(IV) oxide (CAS NO: 3153-26-2) and 0.06 part by mass of tris(acetylacetonato)yttrium (CAS NO: 15554-47-9) was fed into a melt extruder, where it was melted and mixed at a melting temperature of 320° C., and spun at a discharge rate of 16 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the vanadium content was 0.09% by mass, and the yttrium content was 0.011% by mass. 10 g of the activated carbon precursor was placed in an activation furnace (volume: 0.044 m³), and a gas having a $CO_2$ concentration of 100% by volume and a temperature of about 20° C. was introduced into the activation furnace at a flow rate of about 15 L/min (calculated at 0° C. and 1 atmosphere). The activated carbon precursor was activated by conducting a heat treatment for 25 minutes at an atmospheric temperature of 950° C. in the activation furnace. As a result, an activated carbon of condition 2-1 was obtained. In the activated carbon, the pore volume A of pores with a size of 1.0 nm or less was 0.378 cc/g.

<Condition 2-2: V/Y Added>

An activated carbon of condition 2-2 was obtained as in condition 2-1, except that the activation time was 38 minutes. In the activated carbon, the pore volume A of pores with a size of 1.0 nm or less was 0.427 cc/g.

<Condition 2-3: V/Y Added>

An activated carbon of condition 2-3 was obtained as in condition 2-1, except that the activation time was 44 minutes. In the activated carbon, the pore volume A of pores with a size of 1.0 nm or less was 0.442 cc/g.

The relationships between the activation times of conditions 2-1 to 2-3 and the pore volume A of pores with a size of 1.0 nm or less are plotted in FIG. 1.

<Condition 3-1: Zn Added>

A mixture obtained by mixing 1.3 parts by mass of zinc caprylate (CAS NO: 557-09-5) as a metal component into 100 parts by mass of granular coal pitch having a softening point of 280° C. as an organic material was fed into a melt extruder, where it was melted and mixed at a melting temperature of 320° C., and spun at a discharge rate of 16 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the zinc content was 0.19% by mass. 10 g of the activated carbon precursor was placed in an activation furnace (volume: 0.044 m$^3$), and a gas having a $CO_2$ concentration of 100% by volume and a temperature of about 20° C. was introduced into the activation furnace at a flow rate of about 15 L/min (calculated at 0° C. and 1 atmosphere). The activated carbon precursor was activated by conducting a heat treatment for 25 minutes at an atmospheric temperature of 950° C. in the activation furnace. As a result, an activated carbon of condition 3-1 was obtained. In the activated carbon, the pore volume A of pores with a size of 1.0 nm or less was 0.258 cc/g.

<Condition 3-2: Zn Added>

An activated carbon of condition 3-2 was obtained as in condition 3-1, except that the activation time was 60 minutes. In the activated carbon, the pore volume A of pores with a size of 1.0 nm or less was 0.383 cc/g.

<Condition 3-3: Zn Added>

An activated carbon of condition 3-3 was obtained as in condition 3-1, except that the activation time was 100 minutes. In the activated carbon, the pore volume A of pores with a size of 1.0 nm or less was 0.467 cc/g.

The relationships between the activation times of conditions 3-1 to 3-3 and the pore volume A of pores with a size of 1.0 nm or less are plotted in FIG. 1.

<Condition 4-1: Zr Added>

A mixture obtained by mixing 100 parts by mass of granular coal pitch having a softening point of 280° C. as an organic material with 0.8 part by mass of zirconium acetylacetonate (CAS NO: 17501-44-9) was fed into a melt extruder, where it was melted and mixed at a melting temperature of 320° C., and spun at a discharge rate of 16 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the zirconium content was 0.19% by mass. 10 g of the activated carbon precursor was placed in an activation furnace (volume: 0.044 m$^3$), and a gas having a $CO_2$ concentration of 100% by volume and a temperature of about 20° C. was introduced into the activation furnace at a flow rate of about 15 L/min (calculated at 0° C. and 1 atmosphere). The activated carbon precursor was activated by conducting a heat treatment for 25 minutes at an atmospheric temperature of 950° C. in the activation furnace. As a result, an activated carbon of condition 4-1 was obtained. In the activated carbon, the pore volume A of pores with a size of 1.0 nm or less was 0.259 cc/g.

<Condition 4-2: Zr Added>

An activated carbon of condition 4-2 was obtained as in condition 4-1, except that the activation time was 40 minutes. In the activated carbon, the pore volume A of pores with a size of 1.0 nm or less was 0.315 cc/g.

<Condition 4-3: Zr Added>

An activated carbon of condition 4-3 was obtained as in condition 4-1, except that the activation time was 60 minutes. In the activated carbon, the pore volume A of pores with a size of 1.0 nm or less was 0.367 cc/g.

The relationships between the activation times of conditions 4-1 to 4-3 and the pore volume A of pores with a size of 1.0 nm or less are plotted in FIG. 1.

<Condition 5-1: Y Added>

A mixture obtained by mixing 1.0 part by mass of tris(acetylacetonato)yttrium (CAS NO: 15554-47-9) as a metal component into 100 parts by mass of granular coal pitch having a softening point of 280° C. as an organic material was fed into a melt extruder, where it was melted and mixed at a melting temperature of 320° C., and spun at a discharge rate of 16 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the yttrium content was 0.16% by mass. 10 g of the activated carbon precursor was placed in an activation furnace (volume: 0.044 m$^3$), and a gas having a $CO_2$ concentration of 100% by volume and a temperature of about 20° C. was introduced into the activation furnace at a flow rate of about 15 L/min (calculated at 0° C. and 1 atmosphere). The activated carbon precursor was activated by conducting a heat treatment for 25 minutes at an atmospheric temperature of 950° C. in the activation furnace. As a result, an activated carbon of condition 5-1 was obtained. In the activated carbon, the pore volume A of pores with a size of 1.0 nm or less was 0.278 cc/g.

<Condition 5-2: Y Added>

An activated carbon of condition 5-2 was obtained as in condition 5-1, except that the activation time was 32 minutes. In the activated carbon, the pore volume A of pores with a size of 1.0 nm or less was 0.302 cc/g.

<Condition 5-3: Y Added>

An activated carbon of condition 5-3 was obtained as in condition 5-1, except that the activation time was 40 minutes. In the activated carbon, the pore volume A of pores with a size of 1.0 nm or less was 0.352 cc/g.

The relationships between the activation times of conditions 5-1 to 5-3 and the pore volume A of pores with a size of 1.0 nm or less are plotted in FIG. 1.

<Condition 6-1: No Metal Added>

Granular coal pitch having a softening point of 280° C. as an organic material was fed into a melt extruder, where it was melted and mixed at a melting temperature of 320° C., and spun at a discharge rate of 20 g/min, to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. Because no metal component was added, the metal content in the activated carbon precursor was 0% by mass. 10 g of the activated carbon precursor was placed in an activation furnace (volume: 0.044 m$^3$), and a gas having a $CO_2$ concentration of 100% by volume and a temperature of about 20° C. was introduced into the activation furnace at a flow rate of about 15 L/min (calculated at 0° C. and 1 atmosphere). The activated carbon precursor was activated by conducting a heat treatment for 60 minutes at an atmospheric temperature of 950° C. in the activation furnace. As a result, an activated carbon of condition 6-1 was obtained. In the activated carbon, the pore volume A of pores with a size of 1.0 nm or less was 0.311 cc/g.

<Condition 6-2: No Metal Added>

An activated carbon of condition 6-2 was obtained as in condition 6-1, except that the activation time was 90 minutes. In the activated carbon, the pore volume A of pores with a size of 1.0 nm or less was 0.428 cc/g.

<Condition 6-3: No Metal Added>

An activated carbon of condition 6-3 was obtained as in condition 6-1, except that the activation time was 125 minutes. In the activated carbon, the pore volume A of pores with a size of 1.0 nm or less was 0.462 cc/g.

The relationships between the activation times of conditions 6-1 to 6-3 and the pore volume A of pores with a size of 1.0 nm or less are plotted in FIG. 1.

As described in the tests of conditions 1-1 to 6-3 above, and as shown in FIG. 1, under conditions 1-1 to 1-3 and conditions 2-1 to 2-3, in which the vanadium compound was used as the metal compound to be incorporated into the activated carbon precursor, and the activated carbon precursor was activated using $CO_2$, the rate of development of pores with a size of 1.0 nm or less was markedly increased compared to under the other conditions. This has revealed that when a vanadium compound is used as the metal compound to be incorporated into an activated carbon precursor, and the activated carbon precursor is activated using $CO_2$, the vanadium compound has a significant effect on the development of pores with a size of 1.0 nm or less, and a behavior that is completely different from the behaviors when, for example, other metal compounds are used, is exhibited in terms of the development of the pores with a size of 1.0 nm or less. Further research by the present inventors has subsequently revealed that, by using a vanadium compound as the metal compound to be incorporated into an activated carbon precursor, and selecting $CO_2$, which reacts with the activated carbon precursor more slowly than steam, as the activation gas, and then activating the activated carbon precursor, and also by controlling the pore volume A of pores with a size of 1.0 nm or less, of pore volumes calculated by the QSDFT method, to fall in a specific range, an activated carbon is obtained having a high total trihalomethane filtration capacity, even in water treatment by passing water at a high superficial velocity (SV), without the need to develop mesopores.

While the reason why the activated carbon of the present invention has a high total trihalomethane filtration capacity even in water treatment by passing water at a high superficial velocity (SV) is not necessarily clear, because a completely different behavior is exhibited in terms of the development of the pores with a size of 1.0 nm or less, as described above, the shape, the pore volume, the structure, and the like of these pores are assumed to be completely different from those of the conventional pores, and it is believed that as a result of this, the activated carbon of the present invention has a high total trihalomethane filtration capacity, even in water treatment by passing water at a high superficial velocity (SV). In particular, a large number of the pores with a size of 1.0 nm or less present in the product of the present invention are considered to make an effective contribution as adsorption sites for total trihalomethane molecules.

In the activated carbon of the present invention, the pore volume A of pores with a size of 1.0 nm or less, of pore volumes calculated by the QSDFT method, is 0.3 cc/g or more. In order to easily impart a higher total trihalomethane filtration capacity, even in water treatment by passing water at a high superficial velocity (SV), the pore volume A is preferably 0.35 cc/g or more. The upper limit of the pore volume A is, for example, 0.8 cc/g, and preferably 0.6 cc/g, but is not limited thereto.

In order for the activated carbon of the present invention to easily have a higher total trihalomethane filtration capacity, even in water treatment by passing water at a high superficial velocity (SV), a pore volume of pores with a size of 0.65 nm or less, of pore volumes calculated by the QSDFT method, is preferably 0.10 cc/g or more and 0.40 cc/g or less, more preferably 0.18 cc/g or more and 0.40 cc/g or less, still more preferably 0.15 cc/g or more and 0.23 cc/g or less, and particularly preferably 0.18 cc/g or more and 0.23 cc/g or less.

In order for the activated carbon of the present invention to easily have a higher total trihalomethane filtration capacity, even in water treatment by passing water at a high superficial velocity (SV), a pore volume of pores with a size of 0.8 nm or less, of pore volumes calculated by the QSDFT method, is preferably 0.20 cc/g or more and 0.55 cc/g or less, more preferably 0.25 cc/g or more and 0.55 cc/g or less, and still more preferably 0.28 cc/g or more and 0.35 cc/g or less.

In order for the activated carbon of the present invention to easily have a higher total trihalomethane filtration capacity, even in water treatment by passing water at a high superficial velocity (SV), a pore volume B of pores with a size of 1.5 nm or less, of pore volumes calculated by the QSDFT method, is preferably 0.25 cc/g or more, more preferably 0.38 cc/g or more, and still more preferably 0.38 cc/g or more and 0.60 cc/g or less.

In order for the activated carbon of the present invention to easily have a higher total trihalomethane filtration capacity, even in water treatment by passing water at a high superficial velocity (SV), a pore volume C of pores with a size of 2.0 nm or less, of pore volumes calculated by the QSDFT method, is preferably 0.25 cc/g or more, and more preferably 0.38 cc/g or more and 0.60 cc/g or less.

In order for the activated carbon of the present invention to easily have a higher total trihalomethane filtration capacity, even in water treatment by passing water at a high superficial velocity (SV), a pore volume of pores with a size of 2.0 nm or more, of pore volumes calculated by the QSDFT method, is preferably 0.02 cc/g or less, more preferably 0.01 cc/g or less, and still more preferably 0.005 cc/g or less. The lower limit of the pore volume is, for example, 0.001 cc/g, but is not limited thereto.

In order for the activated carbon of the present invention to easily have a higher total trihalomethane filtration capacity, even in water treatment by passing water at a high superficial velocity (SV), a pore volume of pores with a size of 1.0 nm or more and 1.5 nm or less, of pore volumes calculated by the QSDFT method, is preferably 0.01 cc/g or more and 0.12 cc/g or less. Furthermore, in order for a higher filtration capacity for chloroform, among total trihalomethanes, to be exhibited, the pore volume of pores with a size of 1.0 nm or more and 1.5 nm or less is preferably 0.01 cc/g or more and 0.06 cc/g or less.

In order for the activated carbon of the present invention to easily have a higher total trihalomethane filtration capacity, even in water treatment by passing water at a high superficial velocity (SV), a pore volume of pores with a size of 1.0 nm or more and 2.0 nm or less, of pore volumes calculated by the QSDFT method, is preferably 0.015 cc/g or more and 0.14 cc/g or less. Furthermore, in order for a higher filtration capacity for chloroform, among total trihalomethanes, to be exhibited, the pore volume of pores with a size of 1.0 nm or more and 2.0 nm or less is preferably 0.015 cc/g or more and 0.08 cc/g or less.

In order for the activated carbon of the present invention to easily have a higher total trihalomethane filtration capacity, even in water treatment by passing water at a high superficial velocity (SV), a pore volume of pores with a size of 0.65 nm or more and 0.8 nm or less, of pore volumes calculated by the QSDFT method, is preferably 0.08 cc/g or more and 0.15 cc/g or less, and more preferably 0.100 cc/g or more and 0.130 cc/g or less. Furthermore, in order for a higher filtration capacity for chloroform, among total trihalomethanes, to be exhibited, the pore volume of pores with a size of 0.65 nm or more and 0.8 nm or less is preferably 0.100 cc/g or more and 0.125 cc/g or less.

In order for the activated carbon of the present invention to easily have a higher total trihalomethane filtration capacity, even in water treatment by passing water at a high superficial velocity (SV), a pore volume of pores with a size of 0.65 nm or more and 1.0 nm or less, of pore volumes calculated by the QSDFT method, is preferably 0.060 cc/g or more and 0.250 cc/g or less, and more preferably 0.100 cc/g or more and 0.250 cc/g or less.

In order for the activated carbon of the present invention to easily have a higher total trihalomethane filtration capacity, even in water treatment by passing water at a high superficial velocity (SV), a pore volume of pores with a size of 0.8 nm or more and 1.5 nm or less, of pore volumes calculated by the QSDFT method, is preferably 0.01 cc/g or more and 0.22 cc/g or less.

In order for the activated carbon of the present invention to easily have a higher total trihalomethane filtration capacity, even in water treatment by passing water at a high superficial velocity (SV), a pore volume D of pores with a size of 1.5 nm or more and 2.0 nm or less, of pore volumes calculated by the QSDFT method, is preferably 0.000 cc/g or more and 0.04 cc/g or less, and more preferably 0.001 cc/g or more and 0.04 cc/g or less. Furthermore, in order for a higher filtration capacity for chloroform, among total trihalomethanes, to be exhibited, the pore volume D of pores with a size of 1.5 nm or more and 2.0 nm or less is preferably 0.001 cc/g or more and 0.01 cc/g or less.

The activated carbon of the present invention has a specific surface area (value measured by the BET method (single-point method) using nitrogen as the adsorbate) of, for example, about 500 to 3000 $m^2/g$, preferably about 700 to 3000 $m^2/g$, more preferably about 700 to 1700 $m^2/g$, still more preferably about 800 to 1300 $m^2/g$, and particularly preferably about 900 to 1300 $m^2/g$. A total pore volume of the activated carbon calculated by the QSDFT method is, for example, about 0.20 to 0.80 cc/g, preferably about 0.35 to 0.80 cc/g, more preferably about 0.350 to 0.600 cc/g, still more preferably about 0.380 to 0.600 cc/g, and particularly preferably about 0.380 to 0.520 cc/g.

In order for the activated carbon of the present invention to easily have a higher total trihalomethane filtration capacity, even in water treatment by passing water at a high superficial velocity (SV), a ratio of the pore volume A to the pore volume B (pore volume A/pore volume B) is, for example, 0.75 to 1.00, and preferably 0.80 to 0.95.

In order for the activated carbon of the present invention to easily have a higher total trihalomethane filtration capacity, even in water treatment by passing water at a high superficial velocity (SV), a ratio of the pore volume A to the pore volume C (pore volume A/pore volume C) is, for example, 0.75 to 1.00, and preferably 0.75 to 0.95. The ratio may also be 0.75 to 0.89.

In order for the activated carbon of the present invention to easily have a higher total trihalomethane filtration capacity, even in water treatment by passing water at a high superficial velocity (SV), a ratio of the pore volume D to the pore volume A (pore volume D/pore volume A) is, for example, 0.00 to 0.07, and preferably 0.01 to 0.07.

In order for the activated carbon of the present invention to easily have a higher total trihalomethane filtration capacity, even in water treatment by passing water at a high superficial velocity (SV), a proportion of the pore volume A relative to the total pore volume (pore volume A/total pore volume) is, for example, 0.75 to 1.00, and preferably 0.75 to 0.95.

In order for the activated carbon of the present invention to easily have a higher total trihalomethane filtration capacity, even in water treatment by passing water at a high superficial velocity (SV), a proportion of the pore volume B relative to the total pore volume (pore volume B/total pore volume) is, for example, 0.95 to 1.00, and preferably 0.95 to 0.99.

In order for the activated carbon of the present invention to easily have a higher total trihalomethane filtration capacity, even in water treatment by passing water at a high superficial velocity (SV), a proportion of the pore volume C relative to the total pore volume (pore volume C/total pore volume) is, for example, 0.98 to 1.00.

In order for the activated carbon of the present invention to easily have a higher total trihalomethane filtration capacity, even in water treatment by passing water at a high superficial velocity (SV), a proportion of the pore volume D relative to the total pore volume (pore volume D/total pore volume) is, for example, 0.05 or less.

In order for the activated carbon of the present invention to easily have a higher total trihalomethane filtration capacity, even in water treatment by passing water at a high superficial velocity (SV), a proportion of the pore volume of pores with a size of 0.65 nm or less, of pore volumes calculated by the QSDFT method, relative to the total pore volume (pore volume of pores with a size of 0.65 nm or less/total pore volume) is, for example, 0.3 to 0.8, and preferably 0.3 to 0.52. Furthermore, in order for a higher filtration capacity for chloroform, among total trihalomethanes, to be exhibited, the proportion is preferably 0.42 to 0.52.

In order for the activated carbon of the present invention to easily have a higher total trihalomethane filtration capacity, even in water treatment by passing water at a high superficial velocity (SV), a proportion of the pore volume of pores with a size of 0.8 nm or less, of pore volumes calculated by the QSDFT method, relative to the total pore volume (pore volume of pores with a size of 0.8 nm or less/total pore volume) is, for example, 0.5 to 0.98, and preferably 0.5 to 0.78. Furthermore, in order for a higher filtration capacity for chloroform, among total trihalomethanes, to be exhibited, the proportion is preferably 0.68 to 0.78.

The activated carbon of the present invention contains elemental vanadium and/or a vanadium compound. As described above, the elemental vanadium and/or the vanadium compound is derived from the vanadium compound contained in an activated carbon precursor before activation.

A (total) mass proportion of the elemental vanadium and the vanadium compound contained in the activated carbon, relative to the total mass of the activated carbon of the present invention, is, for example, 0.01 to 1.0% by mass, and preferably 0.01 to 0.3% by mass. The proportion represents the proportion in terms of elemental vanadium (i.e., vanadium content) measured using an ICP emission spectrometer (model number: 715-ES available from Varian Inc.). In the present invention, at least a portion of the elemental vanadium and/or the vanadium compound contained in the activated carbon may be removed by washing. In the activated carbon obtained by washing for removal of the elemental vanadium and/or the vanadium compound, a (total) mass proportion of the elemental vanadium and the vanadium compound may be 0.00% by mass.

The activated carbon of the present invention may contain a metal element other than vanadium and/or a metal compound other than vanadium, as long as the effects of the present invention are not impaired. Examples of the metal element other than vanadium and/or the metal compound other than vanadium include at least one metal element selected from the group consisting of, for example, Y (yttrium), Mg (magnesium), Mn (manganese), La (lanthanum), Zr (zirconium), Ce (cerium), Ti (titanium), Co (cobalt), and Fe (iron), and compounds containing such metal elements as constitutional metal elements. The metal element other than vanadium and/or the metal compound other than vanadium are/is derived from those/that contained in the activated carbon precursor before activation, as with the elemental vanadium and/or the vanadium compound contained in the activated carbon of the present invention.

In particular, it is preferred that the metal element other than vanadium and/or the metal compound other than vanadium be elemental yttrium and/or an yttrium compound. Vanadium is effective in maintaining an increased volume of micropores with a size of 1.0 nm or less, while yttrium is effective in allowing relatively large pores to be appropriately distributed. These relatively large pores help an adsorbate diffuse into pores, which is advantageous in water treatment by passing water at a high superficial velocity (SV).

When the activated carbon of the present invention contains a metal element other than vanadium and/or a metal compound other than vanadium, a (total) mass proportion of the metal element other than vanadium and the metal compound other than vanadium, relative to the total mass of the activated carbon, is, for example, 0.001 to 0.05% by mass. The proportion represents the proportion in terms of the metal element (i.e., the metal content) measured using an ICP emission spectrometer (model number: 715-ES available from Varian Inc.). Furthermore, in the activated carbon of the present invention, a ratio of the (total) mass proportion of the elemental vanadium and the vanadium compound contained in the activated carbon, relative to the total mass of the activated carbon of the present invention, with respect to the (total) mass proportion of the metal element other than vanadium and the metal compound other than vanadium contained in the activated carbon, relative to the total mass of the activated carbon of the present invention ((total) mass proportion of elemental vanadium and vanadium compound/ (total) mass proportion of metal element other than vanadium and metal compound other than vanadium) is preferably 5 to 12, in order to easily impart a higher total trihalomethane filtration capacity, even in water treatment by passing water at a high superficial velocity (SV).

Examples of forms of the activated carbon of the present invention include, but are not limited to, a granular activated carbon, a powdered activated carbon, and a fibrous activated carbon. A fibrous activated carbon is preferred because of the processability for processing for use as a filter and the rate of adsorption for use as a water purifier. The fibrous activated carbon preferably has an average fiber diameter of 30 μm or less, and more preferably about 5 to 20 μm. The average fiber diameter of the fibrous activated carbon of the present invention represents the value measured using an image processing fiber diameter measurement apparatus (in accordance with JIS K 1477). The particle diameter of the granular activated carbon or the powdered activated carbon may be such that the cumulative volume percentage $D_{50}$ measured by the laser diffraction/scattering method is 0.01 to 5 mm, for example.

The activated carbon of the present invention, in which the pore volume A of pores with a size of 1.0 nm or less, of pore volumes calculated by the QSDFT method, is 0.3 cc/g or more, and elemental vanadium and/or a vanadium compound is contained, has a high total trihalomethane filtration capacity, even in water treatment by passing water at a high superficial velocity (SV). The total trihalomethane filtration capacity of the activated carbon of the present invention, in water treatment by passing water at a high superficial velocity (SV), is, for example, 50 to 90 L/g, and preferably 60 to 80 L/g, at an SV of 3000 $h^{-1}$, for example.

The total trihalomethane filtration capacity (L/g) is measured using the following method: The activated carbon is dried in a dryer at 105° C. for 2 hours or more, and then 3.0 g of the activated carbon is taken as a sample and beaten in a mixer. Thereafter, the activated carbon is packed into a glass column. The glass column is 25 mm in diameter, and packed to a height of 41 mm. Based on "Testing methods for household water purifiers" as specified in JIS-S-3201, sample water having a total trihalomethane ($CHCl_3$: $CHCl_2Br$:$CHClBr_2$:$CHBr_3$=45:30:20:5) concentration of 100±20 ppb is prepared, and the sample water is controlled to a water temperature of 20±1° C., and passed through the activated carbon column at a superficial velocity of 3000 $h^{-1}$. The concentrations in the sample water and filtrate are measured using a non-radiation source-type electron capture detector (GC7000EN available from J-SCIENCE LAB Co., Ltd.), using the headspace method. The sample water is continuously passed until the total trihalomethane removal rate for the filtrate decreases below 80%, and the amount of passed water (L/g) at a removal rate of 80% is determined as the total trihalomethane adsorption capacity of the activated carbon.

The chloroform filtration capacity of the activated carbon of the present invention, in water treatment by passing water at a high superficial velocity (SV), is, for example, 45 to 90 L/g, and preferably 50 to 70 L/g, at an SV of 3000 $h^{-1}$, for example.

The chloroform filtration capacity (L/g) is measured using the following method: The activated carbon is dried in a dryer at 105° C. for 2 hours or more, and then 3.0 g of the activated carbon is taken as a sample and beaten in a mixer. Thereafter, the activated carbon is packed into a glass column. The glass column is 25 mm in diameter, and packed to a height of 41 mm. Based on "Testing methods for household water purifiers" as specified in JIS-S-3201, sample water having a chloroform concentration of 60±12 ppb is prepared, and the sample water is controlled to a water temperature of 20±1° C., and passed through the activated carbon column at a superficial velocity of 3000 $h^{-1}$. The concentrations in the sample water and filtrate are measured using a non-radiation source-type electron capture detector (GC7000EN available from J-SCIENCE LAB Co., Ltd.), using the headspace method. The sample water is continuously passed until the chloroform removal rate for the filtrate decreases below 80%, and the amount of passed water (L/g) at a removal rate of 80% is determined as the chloroform adsorption capacity of the activated carbon.

Next, a method for producing the activated carbon of the present invention will be described in detail.

The method for producing the activated carbon of the present invention preferably comprises the step of activating an activated carbon precursor comprising 0.05 to 1.5% by mass of vanadium at a temperature of 900 to 1000° C. in an atmosphere having a $CO_2$ concentration of 90% by volume or more. That is, the activated carbon of the present invention may be an activated carbon obtained by the method comprising the step of activating an activated carbon precursor comprising 0.05 to 1.5% by mass of vanadium at a temperature of 900 to 1000° C. in an atmosphere having a $CO_2$ concentration of 90% by volume or more. Alternatively, the activated carbon of the present invention may be an activated carbon obtained by a method comprising, after the step of activating, the step of washing for removal of at least a portion of elemental vanadium and/or a vanadium compound contained in the activated carbon.

Conventionally, activated carbons for water purification applications, particularly for removing low-molecular-weight organic halogen compounds such as trihalomethanes, are typically produced using a method in which activated carbon precursors are activated in an atmosphere with a high steam content. For example, Patent Literature 1 discloses, as an implementable method, activating a fullerene used as an activated carbon precursor in an atmosphere in which steam/nitrogen=50/50 (volume ratio). Patent Literature 2 also discloses a method in which an activated carbon precursor containing at least one metal component from Mg, Mn, Fe, Y, Pt, and Gd is activated in an atmosphere containing nitrogen and saturated steam, in order for the volume of pores with a diameter of 30 Å or more and less than 50 Å to fall in a specific range. With these methods, however, increasing the volume of mesopores reduces the pore volume of pores with a size of 1.0 nm or less, and the resulting activated carbons cannot exhibit a sufficient filtration capacity for total trihalomethanes at a high superficial velocity.

In contrast, in the method for producing the activated carbon of the present invention, the activated carbon precursor comprising 0.05 to 1.5% by mass of vanadium is activated using an activation gas containing 90% by volume or more of $CO_2$, which reacts with the activated carbon precursor more slowly than steam. As a result, as described above, a behavior that is completely different from the behaviors when, for example, other metal compounds are used, is exhibited, and an activated carbon can be obtained having a high total trihalomethane filtration capacity, even in water treatment by passing water at a high superficial velocity (SV).

In the method for producing the activated carbon of the present invention, the main raw material of the activated carbon precursor is not limited. Examples include infusibilized or carbonized organic materials and infusible resins such as phenolic resins. Examples of the organic materials include polyacrylonitrile, pitch, polyvinyl alcohol, and cellulose. Pitch, particularly coal pitch, is preferred in terms of the theoretical carbonization yield during carbonization.

In the method for producing the activated carbon of the present invention, the vanadium content in the activated carbon precursor is preferably 0.08 to 1.0% by mass. Vanadium can be incorporated by mixing elemental vanadium or a vanadium compound into the main raw material of the activated carbon precursor. Examples of the vanadium compound to be mixed into the main raw material of the activated carbon precursor include compounds containing vanadium as a constitutional metal element, for example, inorganic metal compounds such as a metal oxide, a metal hydroxide, a metal halide, and a metal sulfate; metal salts of organic acids such as acetic acid; and organometallic compounds. Examples of organometallic compounds include a metal acetylacetonate and an aromatic metal compound. In order to allow the metal to be highly dispersed in the activated carbon precursor, and obtain an activated carbon having a high total trihalomethane filtration capacity, even in water treatment by passing water at a high superficial velocity (SV), an organometallic compound is preferred among the above, and a metal complex having a β-diketone-type compound as a ligand is preferred as the organometallic compound. Examples of β-diketone-type compounds include those having the structures represented by formulae (1) to (3) shown below, and specific examples include acetylacetone. When elemental yttrium and/or an yttrium compound are/is additionally incorporated into the activated carbon of the present invention, elemental vanadium or the vanadium compound and elemental yttrium and/or the yttrium compound may be mixed into the main raw material of the activated carbon precursor. As with the vanadium compound, examples of the yttrium compound to be mixed into the main raw material of the activated carbon precursor include compounds containing yttrium as a constitutional metal element, for example, inorganic metal compounds such as a metal oxide, a metal hydroxide, a metal halide, and a metal sulfate; metal salts of organic acids such as acetic acid; and organometallic compounds. Examples of organometallic compounds include a metal acetylacetonate and an aromatic metal compound. In order to allow the metal to be highly dispersed in the activated carbon precursor, and obtain an activated carbon having a high total trihalomethane filtration capacity, even in water treatment by passing water at a high superficial velocity (SV), an organometallic compound is preferred among the above, and a metal complex having a β-diketone-type compound as a ligand is preferred as the organometallic compound. Examples of β-diketone-type compounds include those having the structures represented by formulae (1) to (3) shown below, and specific examples include acetylacetone.

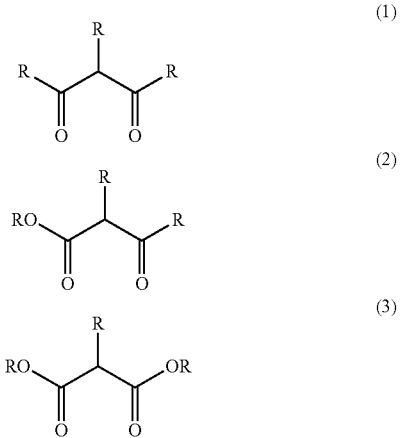

In the method of the present invention, the atmosphere for activation has a $CO_2$ concentration of 90% by volume or more, preferably 95% by volume or more, and more preferably 99% by volume or more. As described above, the reaction proceeds slowly using $CO_2$ as the activation gas, and therefore, the pore size distribution is more easily adjusted as the $CO_2$ concentration is increased, allowing the activated carbon of the present invention to be more easily obtained.

Examples of components other than $CO_2$ in the atmosphere for activation include $N_2$, $O_2$, $H_2$, $H_2O$, and CO.

In the method for producing the activated carbon of the present invention, the atmospheric temperature for activation is typically about 900 to 1000° C., and preferably about 900 to 980° C. The activation time may be adjusted to give a predetermined pore size distribution, according to the main raw material of the activated carbon precursor, the metal compound content, the $CO_2$ concentration in the activation gas, and the like. For example, when pitch having a softening point of 275 to 288° C. is used as the main raw material of the activated carbon precursor, the metal compound content in the activated carbon precursor is 0.1 to 1.5 parts by mass, and the $CO_2$ concentration is 100% by volume, the activation may be carried out at an atmospheric temperature for activation of 900 to 1000° C., for an activation time of 20 to 70 minutes.

EXAMPLES

The present invention will be hereinafter described in detail with reference to examples and comparative examples; however, the present invention is not limited to the examples.

For each of the examples and comparative examples, evaluations were conducted using the following methods:
(1) Vanadium Content and Yttrium Content (% by Mass) in Activated Carbon Precursor (Infusibilized Pitch Fiber)

The pitch fiber was subjected to an ashing treatment, the ash was dissolved in an acid, and the proportions in terms of elemental vanadium and elemental yttrium as measured using an ICP emission spectrometer (model number: 715-ES available from Varian Inc.) were determined as the vanadium content and the yttrium content, respectively.
(2) Metal Contents (% by Mass) in Activated Carbon The fibrous activated carbon was subjected to an ashing treatment, the ash was dissolved in an acid, and the proportions in terms of elemental vanadium and elemental yttrium as measured using an ICP emission spectrometer (model number: 715-ES available from Varian Inc.) were determined as the vanadium content and the yttrium content, respectively.
(3) Pore Volumes (Cc/g), Specific Surface Area ($m^2/g$), and Fiber Diameter (μm) of Fibrous Activated Carbon The physical property values of pores were measured based on a nitrogen adsorption isotherm at 77 K, using "AUTOSORB-1-MP" available from Quantachrome. The specific surface area was calculated by the BET method, from the measurement point at a relative pressure of 0.1. The total pore volume and the pore volume of pores with each range of sizes shown in Table 1 were analyzed by calculating a pore size distribution by applying the calculation model, $N_2$ at 77K on carbon [slit pore, QSDFT equilibrium model], to the measured nitrogen desorption isotherm. Specifically, the pore volume of pores with each range of sizes shown in Table 1 represents the reading from the graph showing the pore size distribution shown in each of FIGS. 1 to 11, or the value calculated based on the reading. More specifically, the pore volume of pores with a size of 0.65 nm or less represents the reading of Cumulative Pore Volume (cc/g) at a Pore Width of 0.65 nm along the horizontal axis on the pore size distribution diagram. Similarly, the pore volume of pores with a size of 0.8 nm or less, the pore volume A of pores with a size of 1.0 nm or less, the pore volume B of pores with a size of 1.5 nm or less, and the pore volume C of pores with a size of 2.0 nm or less were determined. The pore volume of pores with a size of 2.0 nm or more was calculated by subtracting the pore volume C of pores with a size of 2.0 nm or less from the total pore volume determined by the QSDFT method. The pore volume of pores with a size of 1.0 nm or more and 1.5 nm or less was calculated by subtracting the pore volume A of pores with a size of 1.0 nm or less from the pore volume B of pores with a size of 1.5 nm or less. The pore volume of pores with a size of 1.0 nm or more and 2.0 nm or less was calculated by subtracting the pore volume A of pores with a size of 1.0 nm or less from the pore volume C of pores with a size of 2.0 nm or less. The pore volume of pores with a size of 0.65 nm or more and 0.8 nm or less was calculated by subtracting the pore volume of pores with a size of 0.65 nm or less from the pore volume of pores with a size of 0.8 nm or less. The pore volume of pores with a size of 0.65 nm or more and 1.0 nm or less was calculated by subtracting the pore volume of pores with a size of 0.65 nm or less from the pore volume A of pores with a size of 1.0 nm or less. The pore volume of pores with a size of 0.8 nm or more and 1.5 nm or less was calculated by subtracting the pore volume of pores with a size of 0.8 nm or less from the pore volume B of pores with a size of 1.5 nm or less. The pore volume of pores with a size of 1.5 nm or more and 2.0 nm or less was calculated by subtracting the pore volume B of pores with a size of 1.5 nm or less from the pore volume C of pores with a size of 2.0 nm or less.
(4) Fiber Diameter (μm) of Fibrous Activated Carbon The measurement was performed using an image processing fiber diameter measurement apparatus (in accordance with JIS K 1477).
(5) Total Trihalomethane Filtration Capacity (L/g)

The fibrous activated carbon was dried in a dryer at 105° C. for 2 hours or more, and then 3.0 g of the activated carbon was taken as a sample and beaten in a mixer. Thereafter, the activated carbon was packed into a glass column. The glass column was 25 mm in diameter, and packed to a height of 41 mm. Based on "Testing methods for household water purifiers" as specified in JIS-S-3201, sample water having a total trihalomethane ($CHCl_3$:$CHCl_2Br$:$CHClBr_2$:$CHBr_3$=45:30:20:5) concentration of 100±20 ppb was prepared, and the sample water was controlled to a water temperature of 20±1° C., and passed through the activated carbon column at a superficial velocity of 3000 $h^{-1}$. The concentrations in the sample water and filtrate were measured using a non-radiation source-type electron capture detector (GC7000EN available from J-SCIENCE LAB Co., Ltd.), using the headspace method. The sample water was continuously passed until the total trihalomethane removal rate for the filtrate decreased below 80%, and the amount of passed water (L/g) at a removal rate of 80% was determined as the total trihalomethane adsorption capacity of the activated carbon.
(6) Chloroform Filtration Capacity (L/g)

The fibrous activated carbon was dried in a dryer at 105° C. for 2 hours or more, and then 3.0 g of the activated carbon was taken as a sample and beaten in a mixer. Thereafter, the activated carbon was packed into a glass column. The glass column was 25 mm in diameter, and packed to a height of 41 mm. Based on "Testing methods for household water purifiers" as specified in JIS-S-3201, sample water having a chloroform concentration of 60±12 ppb was prepared, and the sample water was controlled to a water temperature of 20±1° C., and passed through the activated carbon column at a superficial velocity of 3000 $h^{-1}$. The concentrations in the sample water and filtrate were measured using a non-radiation source-type electron capture detector (GC7000EN available from J-SCIENCE LAB Co., Ltd.), using the headspace method. The sample water was continuously passed until the chloroform removal rate for the filtrate decreased below 80%, and the amount of passed water (L/g) at a removal rate of 80% was determined as the chloroform adsorption capacity of the activated carbon.

Example 1

A mixture obtained by mixing 100 parts by mass of granular coal pitch having a softening point of 280° C. as an organic material with 0.6 part by mass of bis(2,4-pentanedionato)vanadium(IV) oxide (CAS NO: 3153-26-2) and 0.06 part by mass of tris(acetylacetonato)yttrium (CAS NO: 15554-47-9) was fed into a melt extruder, where it was melted and mixed at a melting temperature of 320° C., and spun at a discharge rate of 16 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the vanadium content was 0.09% by mass, and the yttrium content was 0.011% by mass.

The activated carbon precursor was activated by conducting a heat treatment at an atmospheric temperature of 950° C. for 25 minutes, while continuously introducing a gas having a $CO_2$ concentration of 100% by volume into an activation furnace, to obtain an activated carbon of Example 1. In the activated carbon, the pore volume A of pores with a size of 1.0 nm or less, of pore volumes calculated by the QSDFT method, was 0.378 cc/g, the vanadium content was 0.16% by mass, the yttrium content was 0.02% by mass, and the average fiber diameter was 13.6 μm.

Example 2

An activated carbon of Example 2 was obtained as in Example 1, except that the activation time was 38 minutes. In the activated carbon, the pore volume A of pores with a size of 1.0 nm or less, of pore volumes calculated by the QSDFT method, was 0.427 cc/g, the vanadium content was 0.19% by mass, the yttrium content was 0.02% by mass, and the average fiber diameter was 13.1 μm.

Example 3

An activated carbon of Example 3 was obtained as in Example 1, except that the activation time was 44 minutes. In the activated carbon, the pore volume A of pores with a size of 1.0 nm or less, of pore volumes calculated by the QSDFT method, was 0.442 cc/g, the vanadium content was 0.22% by mass, the yttrium content was 0.03% by mass, and the average fiber diameter was 13.0 μm.

Example 4

A mixture obtained by mixing 100 parts by mass of granular coal pitch having a softening point of 280° C. as an organic material with 0.6 part by mass of bis(2,4-pentanedionato)vanadium(IV) oxide (CAS NO: 3153-26-2) was fed into a melt extruder, where it was melted and mixed at a melting temperature of 320° C., and spun at a discharge rate of 16 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the vanadium content was 0.09% by mass.

The activated carbon precursor was activated by conducting a heat treatment at an atmospheric temperature of 950° C. for 25 minutes, while continuously introducing a gas having a $CO_2$ concentration of 100% by volume into an activation furnace, to obtain an activated carbon of Example 4. In the activated carbon, the pore volume A of pores with a size of 1.0 nm or less, of pore volumes calculated by the QSDFT method, was 0.401 cc/g, the vanadium content was 0.17% by mass, and the average fiber diameter was 13.9 μm.

Example 5

An activated carbon of Example 5 was obtained as in Example 4, except that the activation time was 44 minutes. In the activated carbon, the pore volume A of pores with a size of 1.0 nm or less, of pore volumes calculated by the QSDFT method, was 0.533 cc/g, the vanadium content was 0.22% by mass, and the average fiber diameter was 13.2 μm.

Example 6

A mixture obtained by mixing 100 parts by mass of granular coal pitch having a softening point of 280° C. as an organic material with 0.6 part by mass of bis(2,4-pentanedionato)vanadium(IV) oxide (CAS NO: 3153-26-2) was fed into a melt extruder, where it was melted and mixed at a melting temperature of 325° C., and spun at a discharge rate of 16 g/min to obtain a pitch fiber. The pitch fiber was subjected to an infusibilization treatment by gradually heating to 364° C. in the air, and holding for a total of 87 minutes, to obtain an infusibilized pitch fiber as an activated carbon precursor. In the activated carbon precursor, the vanadium content was 0.10% by mass.

The activated carbon precursor was activated by conducting a heat treatment at an atmospheric temperature of 950° C. for 50 minutes, while continuously introducing a gas having a $CO_2$ concentration of 100% by volume into an activation furnace, to obtain an activated carbon of Example 6. In the activated carbon, the pore volume A of pores with a size of 1.0 nm or less, of pore volumes calculated by the QSDFT method, was 0.381 cc/g, the vanadium content was 0.29% by mass, and the average fiber diameter was 13.6 μm.

Example 7

A mixture obtained by mixing 100 parts by mass of granular coal pitch having a softening point of 280° C. as an organic material with 0.6 part by mass of bis(2,4-pentanedionato)vanadium(IV) oxide (CAS NO: 3153-26-2) was fed into a melt extruder, where it was melted and mixed at a melting temperature of 325° C., and spun at a discharge rate of 16 g/min to obtain a pitch fiber. The pitch fiber was subjected to an infusibilization treatment by gradually heating to 335° C. in the air, and holding for a total of 87 minutes, to obtain an infusibilized pitch fiber as an activated carbon precursor. In the activated carbon precursor, the vanadium content was 0.08% by mass.

The activated carbon precursor was activated by conducting a heat treatment at an atmospheric temperature of 950° C. for 50 minutes, while continuously introducing a gas having a $CO_2$ concentration of 100% by volume into an activation furnace, to obtain an activated carbon of Example 7. In the activated carbon, the pore volume A of pores with a size of 1.0 nm or less, of pore volumes calculated by the QSDFT method, was 0.393 cc/g, the vanadium content was 0.21% by mass, and the average fiber diameter was 13.7 μm.

Comparative Example 1

A test simulating Example 5 of Patent Literature 2 was conducted. Specifically, a mixture obtained by mixing 100 parts by mass of granular coal pitch having a softening point of 280° C. as an organic material with 1.3 parts by mass of tris(acetylacetonato)yttrium (CAS NO: 15554-47-9) was fed into a melt extruder, where it was melted and mixed at a melting temperature of 320° C., and spun at a discharge rate of 20 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the vanadium content was 0.00% by mass.

The activated carbon precursor was activated by conducting a heat treatment at an atmospheric temperature of 900° C. for 20 minutes, while continuously introducing a gas having an $H_2O$ concentration of 100% by volume into an activation furnace, to obtain an activated carbon of Comparative Example 1. In the activated carbon, the pore volume A of pores with a size of 1.0 nm or less, of pore volumes calculated by the QSDFT method, was 0.241 cc/g, the vanadium content was 0.00% by mass, and the average fiber diameter was 16.5 μm.

Comparative Example 2

Granular coal pitch having a softening point of 280° C. as an organic material was fed into a melt extruder, where it was melted and mixed at a melting temperature of 320° C., and spun at a discharge rate of 20 g/min, to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the vanadium content was 0.00% by mass.

The activated carbon precursor was activated by conducting a heat treatment at an atmospheric temperature of 875° C. for 40 minutes, while continuously introducing a gas having an $H_2O$ concentration of 100% by volume into an activation furnace, to obtain an activated carbon of Comparative Example 2. In the activated carbon, the pore volume A of pores with a size of 1.0 nm or less was 0.401 cc/g, the vanadium content was 0.00% by mass, and the average fiber diameter was 16.7 μm.

Comparative Example 3

Granular coal pitch having a softening point of 280° C. as an organic material was fed into a melt extruder, where it was melted and mixed at a melting temperature of 320° C., and spun at a discharge rate of 20 g/min, to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the vanadium content was 0.00% by mass.

The activated carbon precursor was activated by conducting a heat treatment at an atmospheric temperature of 950° C. for 60 minutes, while continuously introducing a gas having a $CO_2$ concentration of 100% by volume into an activation furnace, to obtain an activated carbon of Comparative Example 3. In the activated carbon, the pore volume A of pores with a size of 1.0 nm or less was 0.311 cc/g, the vanadium content was 0.00% by mass, and the average fiber diameter was 18.5 μm.

Comparative Example 4

A mixture obtained by mixing 100 parts by mass of granular coal pitch having a softening point of 280° C. as an organic material with 0.3 part by mass of tris(acetylacetonato)yttrium (CAS NO: 3153-26-2) was fed into a melt extruder, where it was melted and mixed at a melting temperature of 320° C., and spun at a discharge rate of 20 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the vanadium content was 0.00% by mass.

The activated carbon precursor was activated by conducting a heat treatment at an atmospheric temperature of 950° C. for 67 minutes, while continuously introducing a gas having a $CO_2$ concentration of 100% by volume into an activation furnace, to obtain an activated carbon of Comparative Example 4. In the activated carbon, the pore volume A of pores with a size of 1.0 nm or less was 0.418 cc/g, the vanadium content was 0.00% by mass, and the average fiber diameter was 16.8 μm.

Comparative Example 5

A mixture obtained by mixing 100 parts by mass of granular coal pitch having a softening point of 280° C. as an organic material with 0.3 part by mass of tris(acetylacetonato)yttrium (CAS NO: 3153-26-2) was fed into a melt extruder, where it was melted and mixed at a melting temperature of 320° C., and spun at a discharge rate of 20 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the vanadium content was 0.00% by mass.

The activated carbon precursor was activated by conducting a heat treatment at an atmospheric temperature of 950° C. for 70 minutes, while continuously introducing a gas having a $CO_2$ concentration of 100% by volume into an activation furnace, to obtain an activated carbon of Comparative Example 5. In the activated carbon, the pore volume A of pores with a size of 1.0 nm or less was 0.431 cc/g, the vanadium content was 0.00% by mass, and the average fiber diameter was 16.8 μm.

Comparative Example 6

A mixture obtained by mixing 100 parts by mass of granular coal pitch having a softening point of 280° C. as an organic material with 0.3 part by mass of tris(acetylacetonato)yttrium (CAS NO: 3153-26-2) was fed into a melt extruder, where it was melted and mixed at a melting temperature of 320° C., and spun at a discharge rate of 20 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the vanadium content was 0.00% by mass.

The activated carbon precursor was activated by conducting a heat treatment at an atmospheric temperature of 950° C. for 60 minutes, while continuously introducing a gas having a $CO_2$ concentration of 100% by volume into an activation furnace, to obtain an activated carbon of Comparative Example 6. In the activated carbon, the pore volume A of pores with a size of 1.0 nm or less was 0.429 cc/g, the vanadium content was 0.00% by mass, and the fiber diameter was 18.2 μm.

Comparative Example 7

A mixture obtained by mixing 100 parts by mass of granular coal pitch having a softening point of 280° C. as an organic material with 1.0 part by mass of tris(acetylacetonato)yttrium (CAS NO: 3153-26-2) was fed into a melt extruder, where it was melted and mixed at a melting temperature of 320° C., and spun at a discharge rate of 19 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. In the activated carbon precursor, the vanadium content was 0.00% by mass.

The activated carbon precursor was activated by conducting a heat treatment at an atmospheric temperature of 950° C. for 20 minutes, while continuously introducing a gas having a $CO_2$ concentration of 50% by volume and an $H_2O$ concentration of 50% by volume into an activation furnace, to obtain an activated carbon of Comparative Example 7. In the activated carbon, the pore volume A of pores with a size of 1.0 nm or less was 0.255 cc/g, the vanadium content was 0.00% by mass, and the average fiber diameter was 14.6 µm.

The physical properties of the activated carbons are shown in Tables 1 and 2. The pore size distribution diagrams of the activated carbons of Examples 1 to 7 and Comparative Examples 1 to 7 calculated by the QSDFT method are shown in FIGS. 2 to 15.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Production Conditions | Raw material | Coal Pitch | Coal Pitch | Coal Pitch | Coal Pitch | Coal Pitch | Coal Pitch | Coal Pitch |
|  | Metal species | V/Y | V/Y | V/Y | V | V | V | V |
|  | Amount (part(s) by mass) of vanadium compound added | 0.6 | 0.6 | 0.6 | 0.6 | 0.6 | 0.6 | 0.6 |
|  | Amount (part(s) by mass) of yttrium compound added | 0.06 | 0.06 | 0.06 | 0 | 0 | 0 | 0 |
|  | Vanadium (V) content (% by mass) in activated carbon precursor | 0.09 | 0.09 | 0.09 | 0.09 | 0.09 | 0.10 | 0.08 |
|  | Ytttrium (Y) content (% by mass) in activated carbon precursor | 0.011 | 0.011 | 0.011 | 0.00 | 0.00 | 0.00 | 0.00 |
|  | Activation atmosphere (%) CO2 | 100 | 100 | 100 | 100 | 100 | 100 | 100 |
|  | O2 | 0 | 0 | 0 | 0 | 0 | 0 | 0 |
|  |  | 0 | 0 | 0 | 0 | 0 | 0 | 0 |
|  | N2 | 0 | 0 | 0 | 0 | 0 | 0 | 0 |
|  | CO | 0 | 0 | 0 | 0 | 0 | 0 | 0 |
|  | Others | 0 | 0 | 0 | 0 | 0 | 0 | 0 |
|  | Activation temperature (° C.) | 950 | 950 | 950 | 950 | 950 | 950 | 950 |
|  | Activation time (min) | 25 | 38 | 44 | 25 | 40 | 50 | 50 |
| Physical Property Values of Activated Carbon | Vanadium content (% by mass) in activated carbon | 0.16 | 0.19 | 0.22 | 0.17 | 0.22 | 0.29 | 0.21 |
|  | Yttrium content (% by mass in activated carbon) | 0.02 | 0.02 | 0.03 | 0.00 | 0.00 | 0.00 | 0.00 |
|  | Pore volume (cc/g) of pores with a size of 0.65 nm or less | 0.200 | 0.223 | 0.203 | 0.286 | 0.346 | 0.101 | 0.113 |
|  | Pore volume (cc/g) of pores with a size of 0.8 nm or less | 0.308 | 0.345 | 0.331 | 0.382 | 0.487 | 0.219 | 0.236 |
|  | Pore volume A (cc/g) of pores with a size of 1.0 nm or less | 0.378 | 0.427 | 0.442 | 0.401 | 0.533 | 0.381 | 0.393 |
|  | Pore volume B (cc/g) of pores with a size of 1.5 nm or less | 0.400 | 0.482 | 0.535 | 0.401 | 0.582 | 0.553 | 0.515 |
|  | Pore volume C (cc/g) of pores with a size of 2.0 nm or less | 0.402 | 0.492 | 0.557 | 0.401 | 0.594 | 0.579 | 0.526 |
|  | Pore volumn (cc/g) of pores with a size of 2.0 nm or more | 0.001 | 0.000 | 0.003 | 0.000 | 0.000 | 0.067 | 0.066 |
|  | Pore volumn (cc/g) of pores with a size of 1.0-1.5 nm | 0.022 | 0.055 | 0.093 | 0.000 | 0.049 | 0.172 | 0.122 |
|  | Pore volumn (cc/g) of pores with a size of 1.0-2.0 nm | 0.024 | 0.065 | 0.115 | 0.000 | 0.061 | 0.1198 | 0.133 |
|  | Pore volumn (cc/g) of pores with a size of 0.65-0.8 nm | 0.108 | 0.122 | 0.128 | 0.096 | 0.141 | 0.118 | 0.123 |

TABLE 1-continued

|  | Ex. 1 | Ex. 2 | Ex. 3 | Ex. 4 | Ex. 5 | Ex. 6 | Ex. 7 |
|---|---|---|---|---|---|---|---|
| Pore volumn (cc/g) of pores with a size of 0.65-1.0 nm | 0.178 | 0.204 | 0.239 | 0.115 | 0.187 | 0.280 | 0.280 |
| Pore volumn (cc/g) of pores with a size of 0.8-1.5 nm | 0.092 | 0.137 | 0.204 | 0.019 | 0.095 | 0.334 | 0.279 |
| Pore volume D (cc/g) of pores with a size of 1.5-2.0 nm | 0.002 | 0.010 | 0.022 | 0.000 | 0.012 | 0.026 | 0.011 |
| Pore volume A/pore volume B | 0.95 | 0.89 | 0.83 | 1.00 | 0.92 | 0.69 | 0.76 |
| Pore volume A/pore volume C | 0.94 | 0.87 | 0.79 | 1.00 | 0.90 | 0.66 | 0.75 |
| Pore volume A/pore volume A | 0.01 | 0.02 | 0.05 | 0.00 | 0.02 | 0.07 | 0.03 |
| Specific surface area (m/g) | 1041 | 1268 | 1426 | 1051 | 1548 | 1501 | 1385 |
| Total pore volume (cc/g) | 0.403 | 0.492 | 0.560 | 0.401 | 0.594 | 0.646 | 0.592 |
| Proportion of pore volume A to total pore volume | 0.94 | 0.87 | 0.79 | 1.00 | 0.90 | 0.59 | 0.66 |
| Proportion of pore volume B to total pore volume | 0.99 | 0.98 | 0.96 | 1.00 | 0.98 | 0.86 | 0.87 |
| Proportion of pore volume C to total pore volume | 1.00 | 1.00 | 0.99 | 1.00 | 1.00 | 0.90 | 0.89 |
| Proportion of pore volume D to total pore volume | 0.00 | 0.02 | 0.04 | 0.00 | 0.02 | 0.04 | 0.02 |
| Proportion of pore volume of pores with a size of 0.65 nm or less to total pore volume | 0.50 | 0.45 | 0.36 | 0.71 | 0.58 | 0.16 | 0.19 |
| Proportion of pore volume of pores with a size of 0.8 nm or less to total pore volume | 0.76 | 0.70 | 0.59 | 0.95 | 0.82 | 0.34 | 0.40 |
| Average fiber diameter (μm) | 13.6 | 13.1 | 13.0 | 13.9 | 13.2 | 13.6 | 13.7 |
| Adsorption Performance: trihalomethane filtration performance at SV 3000 (L/g) | 67 | 70 | 63 | 56 | 58 | 50 | 53 |
| Adsorption Performance: chloroform filtratioin performance at SV 3000 (L/g) | 65 | 65 | 60 | 55 | 47 | — | — |

TABLE 2

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Production Conditions | Raw material |  | Coal Pitch | Coal Pitch | Coal Pitch | Coal Pitch | Coal Pitch | Coal Pitch | Coal Pitch |
|  | Metal species |  | Y | Y | — | Y | Y | Y | Y |
|  | Amount (part(s) by mass) of vanadium compound added |  | 0 | 0 | 0 | 0 | 0 | 0 | 0 |
|  | Amount (part(s) by mass) of yttrium compound added |  | 1.3 | 0 | 0 | 0.3 | 0.3 | 0.3 | 1.0 |
|  | Vanadium (V) content (% by mass) in activated carbon precursor |  | 0.00 | 0.000 | 0.00 | 0.00 | 0.00 | 0.00 | 0.00 |
|  | Ytttrium (Y) content (% by mass) in activated carbon precursor |  | 0.25 | 0 | 0 | 0.06 | 0.06 | 0.06 | 0.16 |
|  | Activation atmosphere (%) | CO2 | 0 | 0 | 100 | 100 | 100 | 100 | 50 |
|  |  | H2O | 100 | 100 | 0 | 0 | 0 | 0 | 50 |
|  |  | O2 | 0 | 0 | 0 | 0 | 0 | 0 | 0 |
|  |  | N2 | 0 | 0 | 0 | 0 | 0 | 0 | 0 |
|  |  | CO |  |  | 0 | 0 |  | 0 | 0 |
|  |  | Others | 0 | 0 | 0 | 0 | 0 | 0 | 0 |

TABLE 2-continued

| | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Physical Property Values of Activated Carbon | Activation temperature (° C.) | 900 | 875 | 950 | 950 | 950 | 950 | 950 |
| | Activation time (min) | 20 | 40 | 60 | 67 | 70 | 60 | 20 |
| | Vanadium content (% by mass) in activated carbon | 0.00 | 0.00 | 0.00 | 0.00 | 0.00 | 0.00 | 0.00 |
| | Yttrium content (% by mass in activated carbon) | 0.12 | 0 | 0 | 0.17 | 0.18 | 0.15 | 0.46 |
| | Pore volume (cc/g) of pores with a size of 0.65 nm or less | 0.075 | 0.221 | 0.198 | 0.156 | 0.162 | 0.170 | 0.080 |
| | Pore volume (cc/g) of pores with a size of 0.8 nm or less | 0.149 | 0.333 | 0.281 | 0.278 | 0.287 | 0.296 | 0.159 |
| | Pore volume A (cc/g) of pores with a size of 1.0 nm or less | 0.241 | 0.401 | 0.311 | 0.418 | 0.431 | 0.429 | 0.255 |
| | Pore volume B (cc/g) of pores with a size of 1.5 nm or less | 0.339 | 0.465 | 0.315 | 0.613 | 0.636 | 0.581 | 0.353 |
| | Pore volume C (cc/g) of pores with a size of 2.0 nm or less | 0.410 | 0.476 | 0.315 | 0.689 | 0.723 | 0.627 | 0.433 |
| | Pore volumn (cc/g) of pores with a size of 2.0 nm or more | 0.162 | 0.000 | 0.000 | 0.0035 | 0.044 | 0.009 | 0.167 |
| | Pore volumn (cc/g) of pores with a size of 1.0-1.5 nm | 0.098 | 0.064 | 0.004 | 0.195 | 0.205 | 0.152 | 0.098 |
| | Pore volumn (cc/g) of pores with a size of 1.0-2.0 nm | 0.169 | 0.075 | 0.004 | 0.271 | 0.292 | 0.198 | 0.178 |
| | Pore volumn (cc/g) of pores with a size of 0.65-0.8 nm | 0.074 | 0.112 | 0.083 | 0.122 | 0.125 | 0.126 | 0.079 |
| | Pore volumn (cc/g) of pores with a size of 0.65-1.0 nm | 0.166 | 0.180 | 0.113 | 0.262 | 0.269 | 0.259 | 0.175 |
| | Pore volumn (cc/g) of pores with a size of 0.8-1.5 nm | 0.190 | 0.132 | 0.034 | 0.335 | 0.349 | 0.285 | 0.194 |
| | Pore volume D (cc/g) of pores with a size of 1.5-2.0 nm | 0.071 | 0.011 | 0.000 | 0.076 | 0.087 | 0.046 | 0.080 |
| | Pore volume A/pore volume B | 0.71 | 0.86 | 0.99 | 0.68 | 0.68 | 0.74 | 0.72 |
| | Pore volume A/pore volume C | 0.59 | 0.84 | 0.99 | 0.61 | 0.60 | 0.68 | 0.59 |
| | Pore volume A/pore volume A | 0.29 | 0.03 | 0.00 | 0.18 | 0.20 | 0.11 | 0.31 |
| | Specific surface area (m$^2$/g) | 974 | 1257 | 814 | 1714 | 1797 | 1578 | 1128 |
| | Total pore volume (cc/g) | 0.572 | 0.476 | 0.315 | 0.724 | 0.767 | 0.636 | 0.600 |
| | Proportion of pore volume A to total pore volume | 0.42 | 0.84 | 0.99 | 0.58 | 0.56 | 0.67 | 0.43 |
| | Proportion of pore volume B to total pore volume | 0.59 | 0.98 | 1.00 | 0.85 | 0.83 | 0.91 | 0.59 |
| | Proportion of pore volume C to total pore volume | 0.72 | 1.00 | 1.00 | 0.95 | 0.94 | 0.99 | 0.72 |
| | Proportion of pore volume D to total pore volume | 0.12 | 0.02 | 0.00 | 0.10 | 0.11 | 0.07 | 0.13 |
| | Proportion of pore volume of pores with a size of 0.65 nm or less to total pore volume | 0.13 | 0.46 | 0.63 | 0.22 | 0.21 | 0.27 | 0.13 |
| | Proportion of pore volume of pores with a size of 0.8 nm or less to total pore volume | 0.26 | 0.70 | 0.89 | 0.38 | 0.37 | 0.47 | 0.27 |
| | Average fiber diameter (μm) | 16.5 | 16.7 | 18.5 | 16.8 | 16.8 | 18.2 | 14.6 |

TABLE 2-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Adsorption Performance: trihalomethane filtration performance at SV 3000 (L/g) | 37 | 12 | 44 | 26 | 29 | 28 | 41 |
| Adsorption Performance: chloroform filtratioin performance at SV 3000 (L/g) | — | — | — | — | — | — | — |

In the activated carbons of Examples 1 to 7, the pore volume A (cc/g) of pores with a size of 1.0 nm or less, of pore volumes calculated by the QSDFT method, was 0.300 cc/g or more, and elemental vanadium and/or a vanadium compound was contained, and therefore, these activated carbons had high total trihalomethane filtration capacities, even in water treatment by passing water at a high superficial velocity (SV). In particular, a comparison between the activated carbons of Example 2 and Comparative Example 2, which had substantially the same pore structure, shows a clear difference in terms of the above-described effect, depending on whether elemental vanadium and/or a vanadium compound was contained.

In contrast, the activated carbons of Comparative Examples 1 and 7 had inferior total trihalomethane filtration capacities.

The invention claimed is:

1. An activated carbon having:
   a pore volume A (cc/g) of pores with a size of 1.0 nm or less wherein a pore volume calculated by the Quenched Solid Density Functional Theory (QSDFT) method is 0.300 cc/g or more,
   a pore volume B (cc/g) of pores with a size of 1.5 nm or less wherein a pore volume calculated by the QSDFT method is 0.38 cc/g or more,
   wherein the activated carbon has a specific surface area, as measured by BET method (single point using nitrogen as an adsorbate) of between 800 and 1,300 m$^2$/g, and
   wherein elemental vanadium and/or a vanadium compound is contained in the activated carbon.

2. The activated carbon according to claim 1, wherein a proportion of the pore volume A relative to the pore volume B (pore volume A/pore volume B) is 0.75 to 1.00.

3. The activated carbon according to claim 1, wherein the activated carbon has a total trihalomethane filtration capacity of 50 L/g or more.

4. The activated carbon according to claim 1, wherein the activated carbon is a fibrous activated carbon.

5. The activated carbon according to claim 1, which is for use as a water filter.

6. An activated carbon having:
   a first pore volume (cc/g) of pores with a size of 1.0 nm or less wherein a pore volume calculated by the Quenched Solid Density Functional Theory (QSDFT) method is 0.300 cc/g or more,
   a second pore volume of pores with a size of 2.0 nm or more wherein a pore volume calculated by the Quenched Solid Density Functional Theory (QSDFT) method is 0.02 cc/g or less,
   wherein the activated carbon has a specific surface area, as measured by BET method (single point using nitrogen as an adsorbate) of between 800 and 1,300 m$^2$/g, and
   wherein elemental vanadium and/or a vanadium compound is contained in the activated carbon.

7. The activated carbon according to claim 6, further comprising an expanded pore volume (cc/g) of pores with a size of 1.5 nm or less and wherein the pore volume calculated by the Quenched Solid Density Functional Theory (QSDFT) method for a cumulative volume (cc/g) of the first pore volume and the expanded pore volume is 0.38 cc/g or more.

8. The activated carbon according to claim 6, wherein a proportion of the first pore volume relative to the second pore volume is 0.75 to 1.00.

9. The activated carbon according to claim 6, wherein the activated carbon has a total trihalomethane filtration capacity of 50 L/g or more.

10. The activated carbon according to claim 6, wherein the activated carbon is a fibrous activated carbon.

11. The activated carbon according to claim 6, which is for use as a water filter.

12. The activated carbon according to claim 6, which is for use as a water filter.

13. An activated carbon having:
    a first pore volume (cc/g) of pores with a size of 1.0 nm or less, with pore volumes calculated by Quenched Solid Density Functional Theory (QSDFT) method, is 0.300 cc/g or more;
    a second pore volume (cc/g) of pores with a size of 1.5 nm or more and 2.0 nm or less, with pore volumes calculated by the QSDFT method, is between 0.000 cc/g or more and 0.04 cc/g;
    a third pore volume (cc/g) of pores with a size of 2.0 nm or more, with pore volumes calculated by the QSDFT method, is 0.02 cc/g or less; and
    elemental vanadium and/or a vanadium compound.

14. The activated carbon according to claim 13, wherein the first pore volume is 0.38 cc/g or more.

15. The activated carbon according to claim 13, wherein a proportion of the first pore volume relative to the third pore volume is 0.75 to 1.00.

16. The activated carbon according to claim 13, wherein the activated carbon has a total trihalomethane filtration capacity of 50 L/g or more.

17. The activated carbon according to claim 13, wherein the activated carbon is a fibrous activated carbon.

* * * * *